(12) United States Patent
Lee et al.

(10) Patent No.: US 11,877,172 B2
(45) Date of Patent: Jan. 16, 2024

(54) RADIO RESOURCE MANAGEMENT AND SPECTRUM COORDINATION

(71) Applicant: Samsung Electronics Co., Ltd., Suwon-si (KR)

(72) Inventors: Gilwon Lee, Plano, TX (US); Jeongho Jeon, San Jose, CA (US); Joonyoung Cho, Portland, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/209,069

(22) Filed: Mar. 22, 2021

(65) Prior Publication Data

US 2022/0046453 A1    Feb. 10, 2022

Related U.S. Application Data

(60) Provisional application No. 63/061,447, filed on Aug. 5, 2020.

(51) Int. Cl.
*H04W 24/10* (2009.01)
*H04B 17/336* (2015.01)
(Continued)

(52) U.S. Cl.
CPC .......... *H04W 24/10* (2013.01); *H04B 17/318* (2015.01); *H04B 17/336* (2015.01); *H04W 76/27* (2018.02); *H04W 80/02* (2013.01)

(58) Field of Classification Search
CPC ..... H04W 24/10; H04W 76/27; H04W 80/02; H04B 17/318; H04B 17/336
(Continued)

(56) References Cited

U.S. PATENT DOCUMENTS

| 11,363,480 B2 * | 6/2022 | Yi ......................... H04L 5/0048 |
| 2013/0053025 A1 | 2/2013 | Lindoff et al. |

(Continued)

FOREIGN PATENT DOCUMENTS

| CN | 112929926 B * | 4/2022 | ........ H04W 36/0058 |
| WO | WO-2010075739 A1 * | 7/2010 | ............ H04W 24/10 |

(Continued)

OTHER PUBLICATIONS

Yang et al., CN 112929926 A, "Sending method and receiving method of adjacent cell CSI report and related equipment", 22 pages (Year: 2019).*

(Continued)

*Primary Examiner* — Mong-Thuy T Tran

(57) ABSTRACT

A base station (BS) and user equipment (UE) are configured to perform measurement/reporting and spectrum coordination request/response in wireless networks. A method for operating a UE includes receiving configuration information for measuring interference from a neighboring cell, measuring the interference from the neighboring cell based on the configuration information, and computing a change in the measured interference from the neighboring cell based on a current measured interference level and a previous measured interference level. The method further includes determining, based on at least in part a determination that the change in the measured interference exceeds a first threshold, whether to generate a measurement report and transmitting the measurement report on an uplink channel.

20 Claims, 18 Drawing Sheets

(51) Int. Cl.
*H04W 80/02* (2009.01)
*H04W 76/27* (2018.01)
*H04B 17/318* (2015.01)

(58) Field of Classification Search
USPC .......................................................... 370/329
See application file for complete search history.

(56) References Cited

U.S. PATENT DOCUMENTS

| | | | |
|---|---|---|---|
| 2014/0024388 A1* | 1/2014 | Earnshaw | H04L 5/0073 455/452.2 |
| 2014/0313920 A1 | 10/2014 | Chai et al. | |
| 2016/0050648 A1 | 2/2016 | Seo et al. | |
| 2016/0360462 A1* | 12/2016 | Chockalingam | H04W 36/0058 |
| 2018/0035345 A1* | 2/2018 | Chockalingam | H04W 36/30 |
| 2019/0104489 A1* | 4/2019 | Huang | H04W 8/24 |
| 2019/0327651 A1* | 10/2019 | Yiu | H04W 36/0058 |
| 2020/0029239 A1* | 1/2020 | Chen | H04W 76/19 |
| 2020/0169341 A1* | 5/2020 | Hwang | H04W 24/10 |
| 2021/0360492 A1* | 11/2021 | Han | H04W 36/30 |
| 2021/0368377 A1* | 11/2021 | Shi | H04B 17/318 |
| 2022/0191724 A1* | 6/2022 | Hwang | H04J 11/00 |
| 2022/0295323 A1* | 9/2022 | Wang | H04B 17/318 |

FOREIGN PATENT DOCUMENTS

| | | | |
|---|---|---|---|
| WO | 2016123568 A1 | 8/2016 | |
| WO | WO-2021102184 A2 * | 5/2021 | ........ H04W 36/0058 |
| WO | WO-2021159424 A1 * | 8/2021 | |

OTHER PUBLICATIONS

International Search Report and Written Opinion of the International Searching Authority dated Nov. 12, 2021, in connection with International Application No. PCT/KR2021/010311, 7 pages.

3GPP TS 38.331 V16.1.0 (Jul. 2020), Technical Specification, 3rd Generation Partnership Project; Technical Specification Group Radio Access Network; NR; Radio Resource Control (RRC) protocol specification (Release 16), Jul. 2020, 906 pages.

"3rd Generation Partnership Project; Technical Specification Group Radio Access Network; Evolved Universal Terrestrial Radio Access (E-UTRA); Physical channels and modulation (Release 16)", 3GPP TS 36.211 V16.1.0, Mar. 2020, 247 pages.

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.1.0, Mar. 2020, 253 pages.

"3rd Generation Partnership Project; Technical Specification Group Radio Access Network; Evolved Universal Terrestrial Radio Access (E-UTRA); Physical layer procedures (Release 16)", 3GPP TS 36.213 V16.1.0, Mar. 2020, 670 pages.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.0.0, Mar. 2020, 141 pages.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.1.0, Jul. 2020, 1,078 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical channels and modulation (Release 16)", 3GPP TS 38.211 V16.1.0, Mar. 2020, 130 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"3rd Generation Partnership Project; Technical Specification Group Radio Access Network; NR; Physical layer measurements (Release 16)", 3GPP TS 38.215 V16.1.0, Mar. 2020, 22 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

* cited by examiner

US 11,877,172 B2

RADIO RESOURCE MANAGEMENT AND SPECTRUM COORDINATION

CROSS-REFERENCE TO RELATED APPLICATIONS AND CLAIM OF PRIORITY

The present application claims priority to U.S. Provisional Patent Application No. 63/061,447 filed on Aug. 5, 2020. The content of the above-identified patent document is incorporated herein by reference.

TECHNICAL FIELD

The present disclosure relates to electronic devices and methods on radio resource management and/or spectrum coordination operation, more particularly, to electronic devices and methods on measurement/reporting and spectrum coordination request/response in wireless networks.

BACKGROUND

A basic philosophy of New Radio (NR) in $3^{rd}$ Generation Partnership Project (3GPP) is to support beam-specific operations for wireless communication between a gNode B (gNB) and a user equipment (UE). There are several components in the 5G (e.g., fifth generation) NR specification that can efficiently be operated in a beam-specific manner; but that currently do not allow beam specific operations.

Current wireless networks are underutilizing the available spectrums due to several constraints including exclusive spectrum usage among different operators/networks. One promising way to overcome the underutilization of the spectrum is to introduce necessary mechanisms for the networks to enable more efficient utilization of the spectrum, whether it is unlicensed, shared spectrum, or licensed spectrum.

In shared spectrum wireless networks, interference can be severe at cell edge areas between different networks sharing the spectrum due to the non-orthogonal spectrum usage across the networks. Therefore, monitoring the interference on the shared spectrum and proper spectrum coordination between the networks become crucial to reduce the severe interference effect and to improve spectrum utilization efficiency for the networks sharing the shared spectrum. However, in the current NR specification, the radio resource management has been developed mainly to support terminal handover operation between networks, which differs from the purpose of interference monitoring for spectrum coordination in shared spectrum wireless networks.

SUMMARY

Embodiments of the present disclosure provide methods and apparatuses for full power UL MIMO operation in an advanced wireless communication system.

In one embodiment, a user equipment (UE) is provided. The UE includes a transceiver configured to receive configuration information for measuring interference from a neighboring cell. The UE further includes a processor operably connected to the transceiver. The processor is configured to measure, via the transceiver, the interference from the neighboring cell based on the configuration information, compute a change in the measured interference from the neighboring cell based on a current measured interference level and a previous measured interference level, and determine, based on at least in part a determination that the change in the measured interference exceeds a first threshold, whether to generate a measurement report. The transceiver is configured to transmit the measurement report on an uplink channel.

In another embodiment, a base station (BS) is provided. The BS includes a processor and a transceiver operably connected to the processor. The transceiver is configured to transmit configuration information for measuring interference from a neighboring BS and, based at least in part on a change in the interference measured from the neighboring BS between a current interference level and a previous interference level exceeds a first threshold, receive a measurement report.

In yet another embodiment, a method for operating a UE is provided. The method includes receiving configuration information for measuring interference from a neighboring cell, measuring the interference from the neighboring cell based on the configuration information, and computing a change in the measured interference from the neighboring cell based on a current measured interference level and a previous measured interference level. The method further includes determining, based on at least in part a determination that the change in the measured interference exceeds a first threshold, whether to generate a measurement report and transmitting the measurement report on an uplink channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
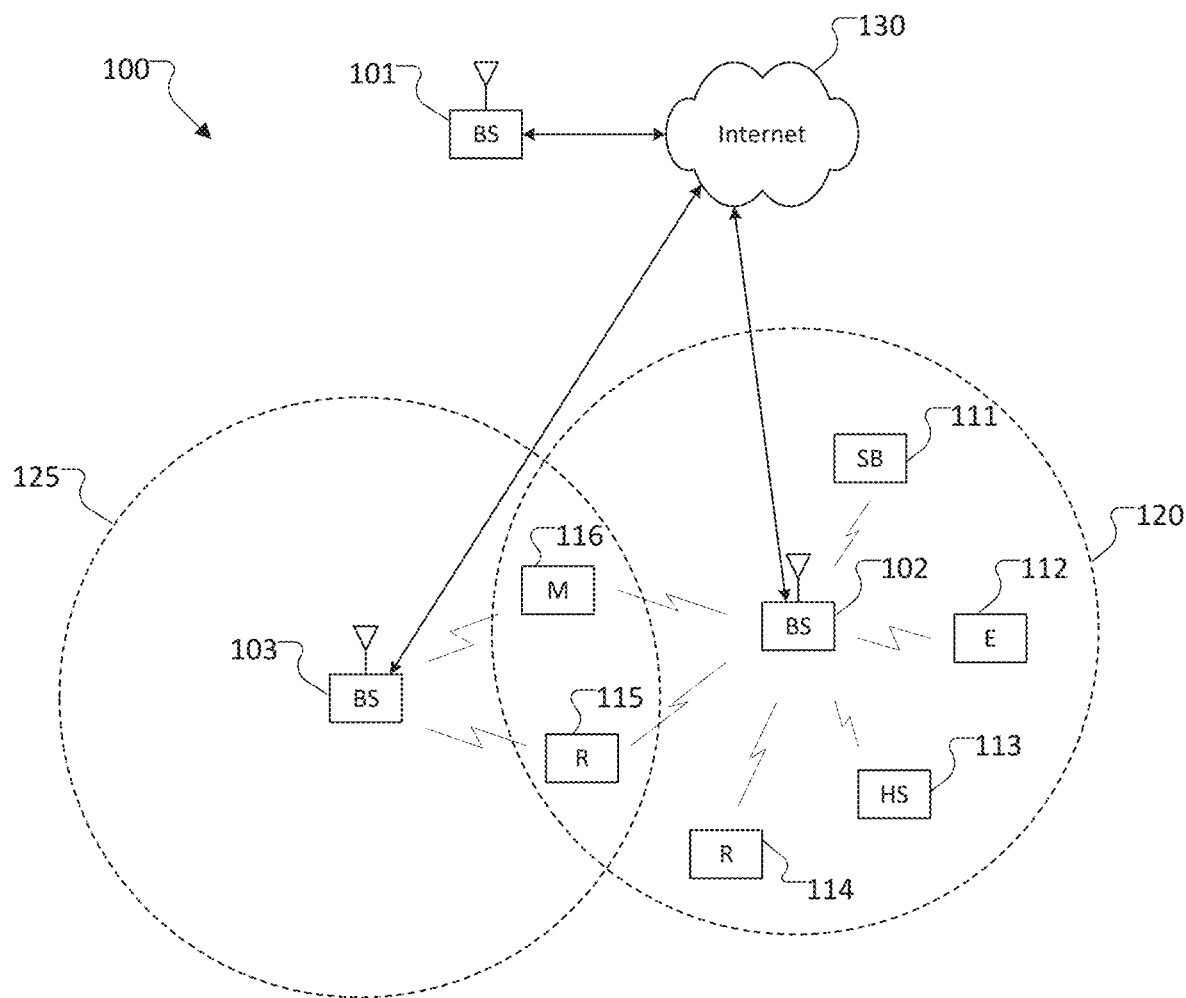
FIG. 1 illustrates an example wireless network according to embodiments of the present disclosure.

FIG. 1 through FIG. 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.1.0, "E-UTRA, Physical channels and modulation;" 3GPP TS 36.212 v16.1.0, "E-UTRA, Multiplexing and channel coding;" 3GPP TS 36.213 v16.1.0, "E-UTRA, Physical layer procedures;" 3GPP TS 36.321 v16.0.0, "E-UTRA, Medium Access Control (MAC) protocol specification;" 3GPP TS 36.331 v16.0.0, "E-UTRA, Radio Resource Control (RRC) Protocol specification;" 3GPP TS 38.211 v16.1.0, "NR, Physical channels and modulation;" 3GPP TS 38.212 v16.1.0, "NR, Multiplexing and channel coding;" 3GPP TS 38.213 v16.1.0, "NR, Physical layer procedures for control;" 3GPP TS 38.214 v16.1.0, "NR, Physical layer procedures for data;" 3GPP TS 38.215 v16.1.0, "NR, Physical layer measurements;" 3GPP TS 38.321 v16.0.0, "NR, Medium Access Control (MAC) protocol specification;" and 3GPP TS 38.331 v16.0.0, "NR, Radio Resource Control (RRC) protocol specification."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both Frequency Division Duplexing (FDD) and Time Division Duplexing (TDD) are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
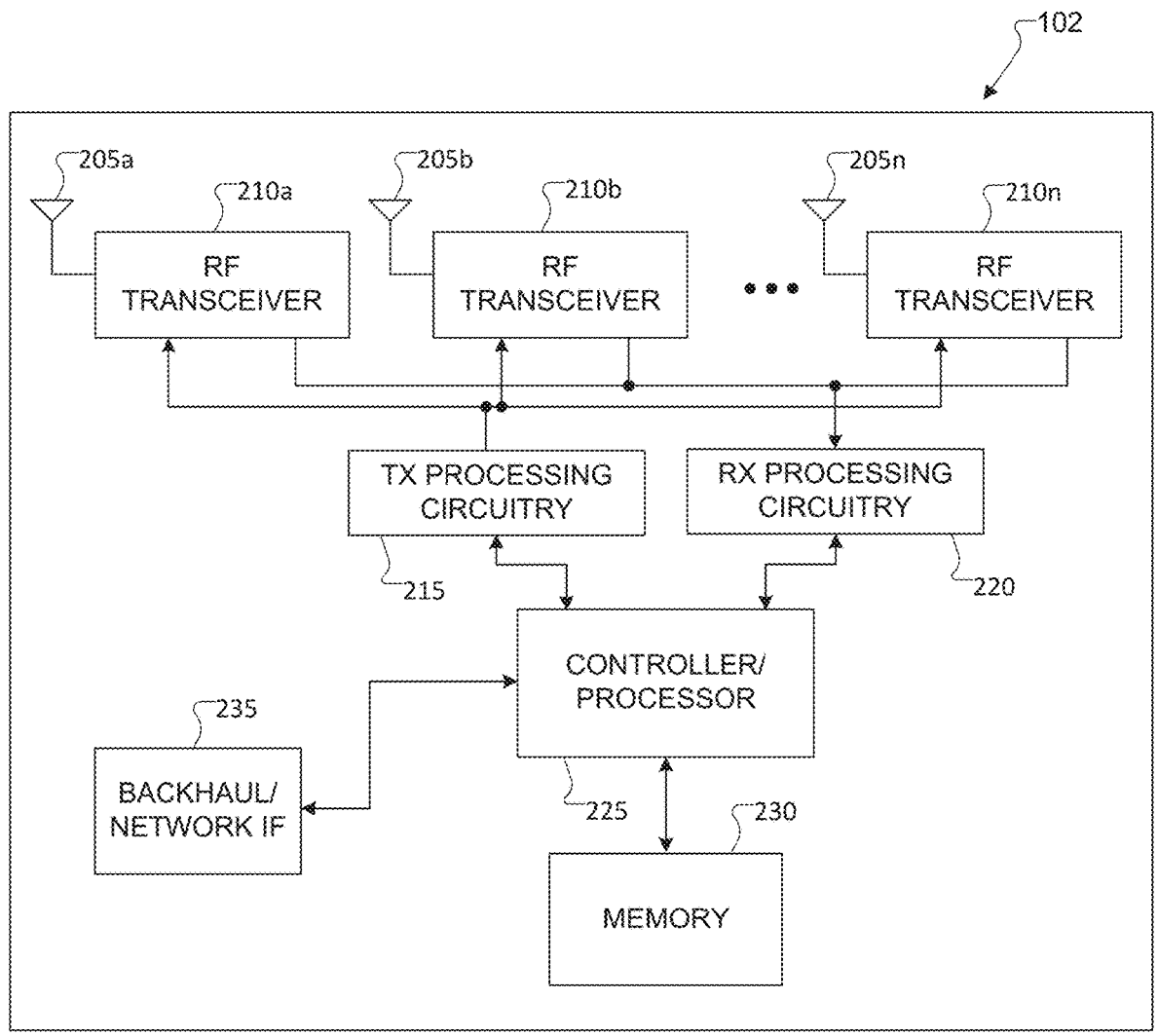
FIG. 2 illustrates an example base station according to embodiments of the present disclosure.
Figure 3:
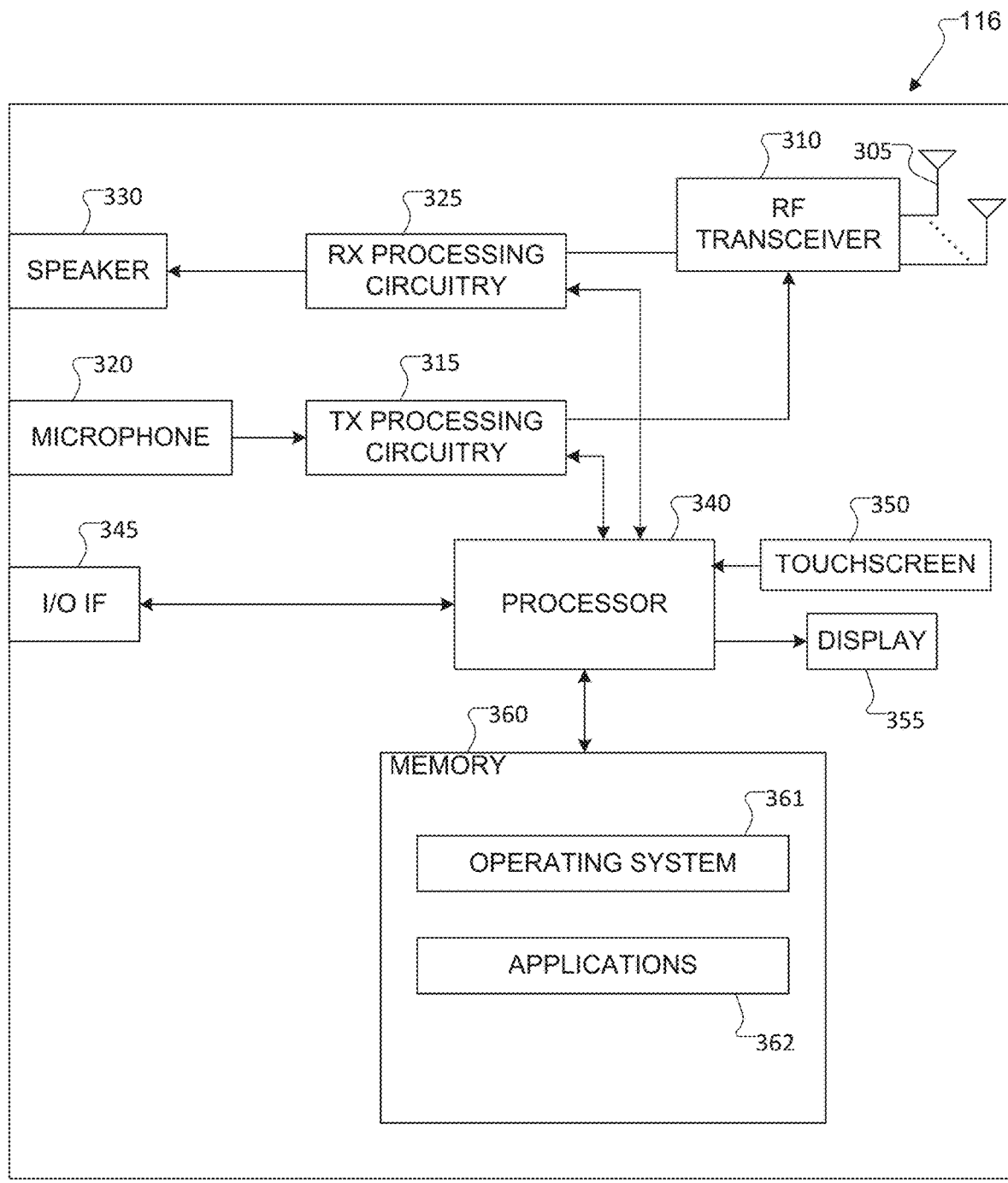
FIG. 3 illustrates an example user equipment according to embodiments of the present disclosure.

In this disclosure, the term 'shared spectrum' is used in an inclusive manner without the distinction on the shared spectrum and unlicensed spectrum and it also includes not only the currently available spectrums but also spectrums that will be made available in the future. Thus, the term 'shared spectrum' should not be interpreted as a limiting factor in determining the scope of this invention FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include a two-dimensional (2D) antenna arrays as described in embodiments of the present disclosure. In some embodiments, one or more of gNB 101, gNB 102 and gNB 103 support the codebook design and structure for systems having 2D antenna arrays.

As described in more detail below, one or more of the UEs 111-116 include circuitry, programing, or a combination thereof, for receiving, via the transceiver, configuration information including one or more of: SSB frequency, SSB subcarrier spacing, CSI-RS frequency, or physical cell ID, measure, via the transceiver, an interference or serving cell signal qualities according to the configuration information, compute a first change in an interference level for a neighboring BS sharing a spectrum with a serving BS, and in response the first change exceeding a first threshold, perform measurement reporting of the measured signal qualities. In certain embodiments, and one or more of the gNBs 101-103 includes circuitry, programing, or a combination thereof, to transmit, via the transceiver, configuration information including one or more of: SSB frequency, SSB subcarrier spacing, CSI-RS frequency, or physical cell ID, an interference or serving cell signal qualities are measured according to the configuration information and a first change in an interference level for a neighboring base station (BS) sharing a spectrum with the BS is computed, and in response the first change exceeding a first threshold, receive a measurement report of the measured signal qualities.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. That is, the controller/processor 225 can perform a blind interference sensing (BIS) process, such as performed by a BIS algorithm, and decode the received signal subtracted by the interfering signals. Any of a wide variety of other functions can be supported in the gNB 102 by the controller/processor 225. In some embodiments, the controller/processor 225 includes at least one microprocessor or microcontroller In certain embodiments, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also capable of supporting channel quality measurement and reporting for systems having 2D antenna arrays as described in embodiments of the present disclosure. In some embodiments, the controller/processor 225 supports communications between entities, such as web RTC. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM. In certain embodiments, a plurality of instructions, such as a BIS algorithm is stored in memory 230. The plurality of instructions are configured to cause the controller/processor 225 to perform the BIS process and to decode a received signal after subtracting out at least one interfering signal determined by the BIS algorithm.

As described in more detail below, the transmit and receive paths of the gNB 102 (implemented using the RF transceivers 210a-210n, TX processing circuitry 215, and/or RX processing circuitry 220) support communication with aggregation of FDD cells and TDD cells.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350 (or key pad), a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for UL transmission on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
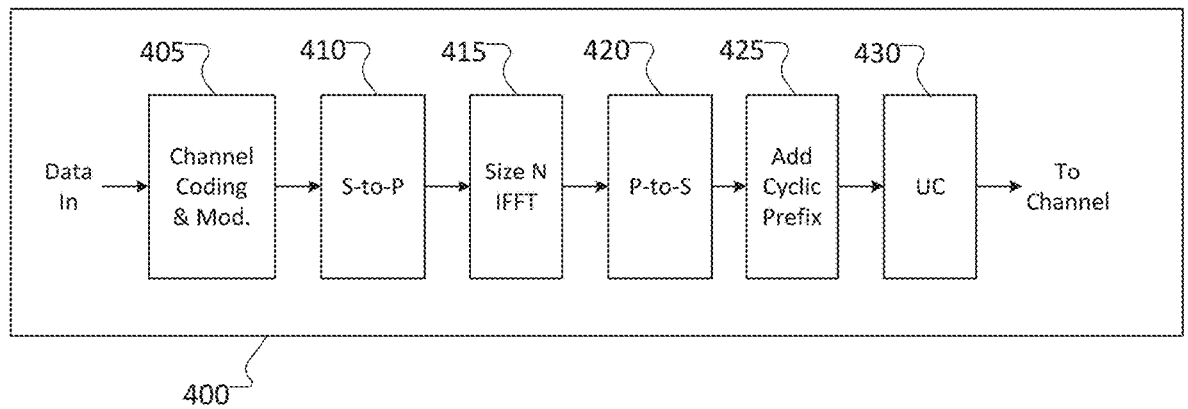
FIG. 4A illustrates a high-level diagram of an orthogonal frequency division multiple access transmit path according to embodiments of the present disclosure.
Figure 4B:
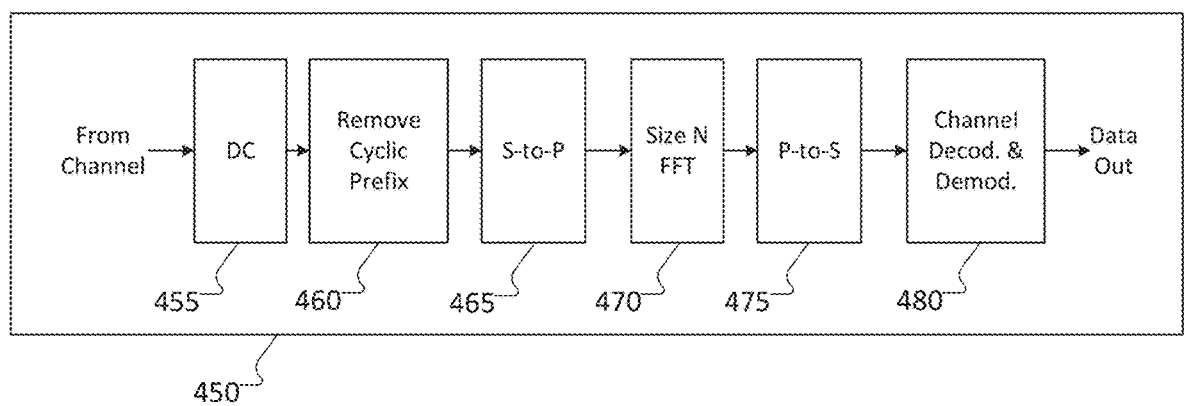
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement (ACK) information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

As operating frequency bands in NR become higher, the UE is evolving to accommodate a plurality of antenna panels to enhance aspects of multi-beam operation such as coverage enhancement, beam failure event minimization, fast beam switching, etc. Depending on hardware architectures, each panel on the UE 116 can perform multi-beam operation in a decoupled manner so that it is possible for the UE 116 to be capable of simultaneously DL/UL operations via multiple beam links, each of which corresponds to sufficiently reliable channels to independently communicate with gNB 102. The previous NR specification only allows multiple panels on UE 116 to be used for simultaneous DL reception or single panel selection for UL transmission in TDD operation.

Figure 5:
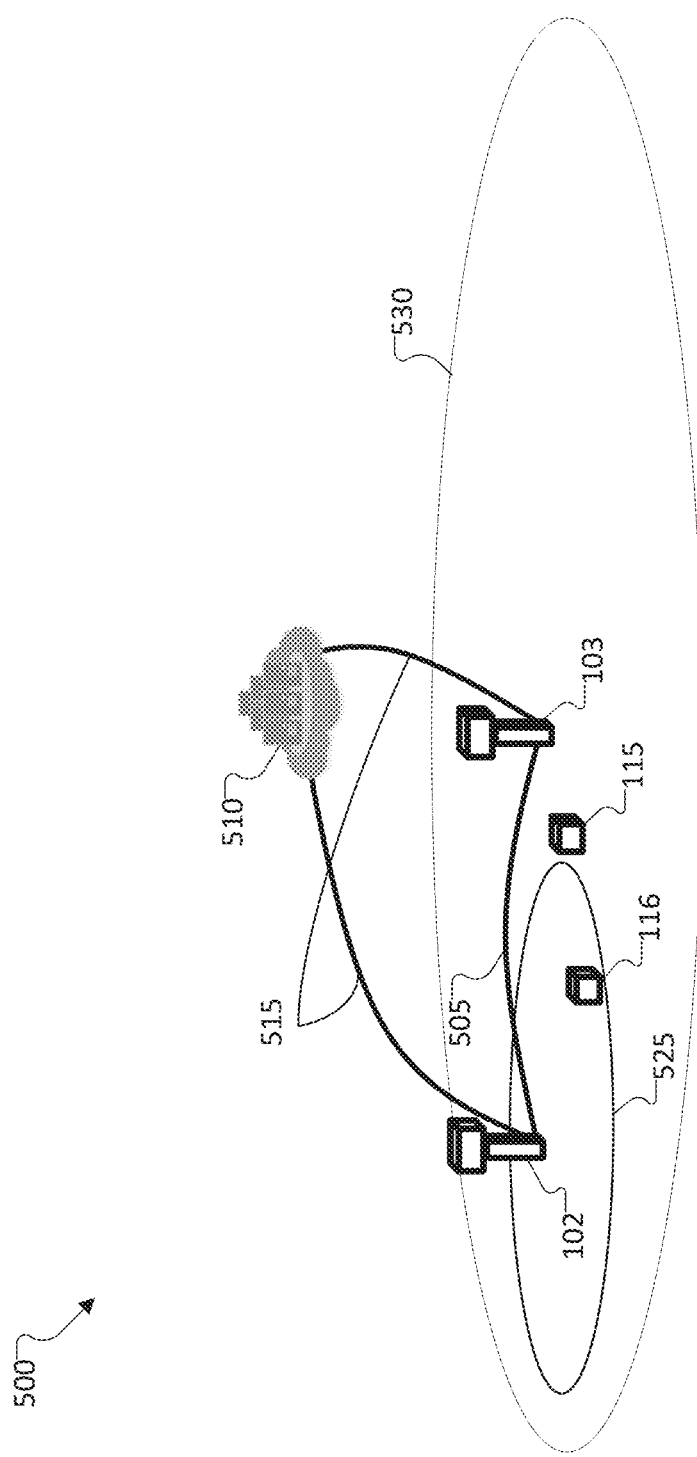
FIG. 5 illustrates a spectrum sharing scenario according to embodiments of the present disclosure.

FIG. 5 illustrates a spectrum sharing scenario according to embodiments of the present disclosure. The embodiment of the spectrum sharing scenario illustrated in FIG. 5 is for illustration only. Other embodiments could be used without departing from the scope of the present disclosure.

In the example shown in FIG. 5, gNB 102 and gNB 103 can be associated with a same network 500. In certain embodiments, gNB 102 and gNB 103 are associated with a first network and a second network, respectively, wherein the first network is different than the second network. For example, each of the networks and be either a public network (PN) or a non-public network (NPN). In one example, the pair of networks {a first network, a second network} can be one or: first network being an NPN and second network being a PN={NPN, PN}; a {PN, NPN}; {PN, PN}; or {NPN, NPN}. In the network 500 shown in the example illustrated in FIG. 5, gNB 102 can be a BS of an NPN and gNB 103 can be a BS of a PN. In certain embodiments, gNB 102 and gNB 103 can be an NPN radio access network (RAN) node and a PN RAN node, respectively. In certain embodiments, gNB 102 and gNB 103 are operated by a single operator. In certain embodiments, gNB 102 and gNB 103 are operated by different operators. In certain embodiments, gNB 102 and gNB 103 are connected with each other via link 505, such as an Xn interface, and each of gNB 102 and gNB 103 are also connected with spectrum sharing management function (SSMF) 510 through link 515, such as an S1 interface, respectively.

The SSMF 510 can include one or more processors or processor circuitry included within a network server, service provider server, network node, or another base station. In certain embodiments, the SSMF 510 manages spectrum coordination requests and responses between gNB 102 and gNB 103. In certain embodiments, SSMF 510 is a management function of core network for gNB 102 and gNB 103. In certain embodiments, SSMF 510 is a manager in a RAN intelligent controller connecting core networks for gNB 102 and gNB 103. In network 500, as an example, UE 116 is associated with (a.w.) gNB 102 and is in the coverage region 525 of gNB 102. Also in network 500, as an example, UE 115 is associated with gNB 103 and is in the coverage region 530 of gNB 103

Figure 6:
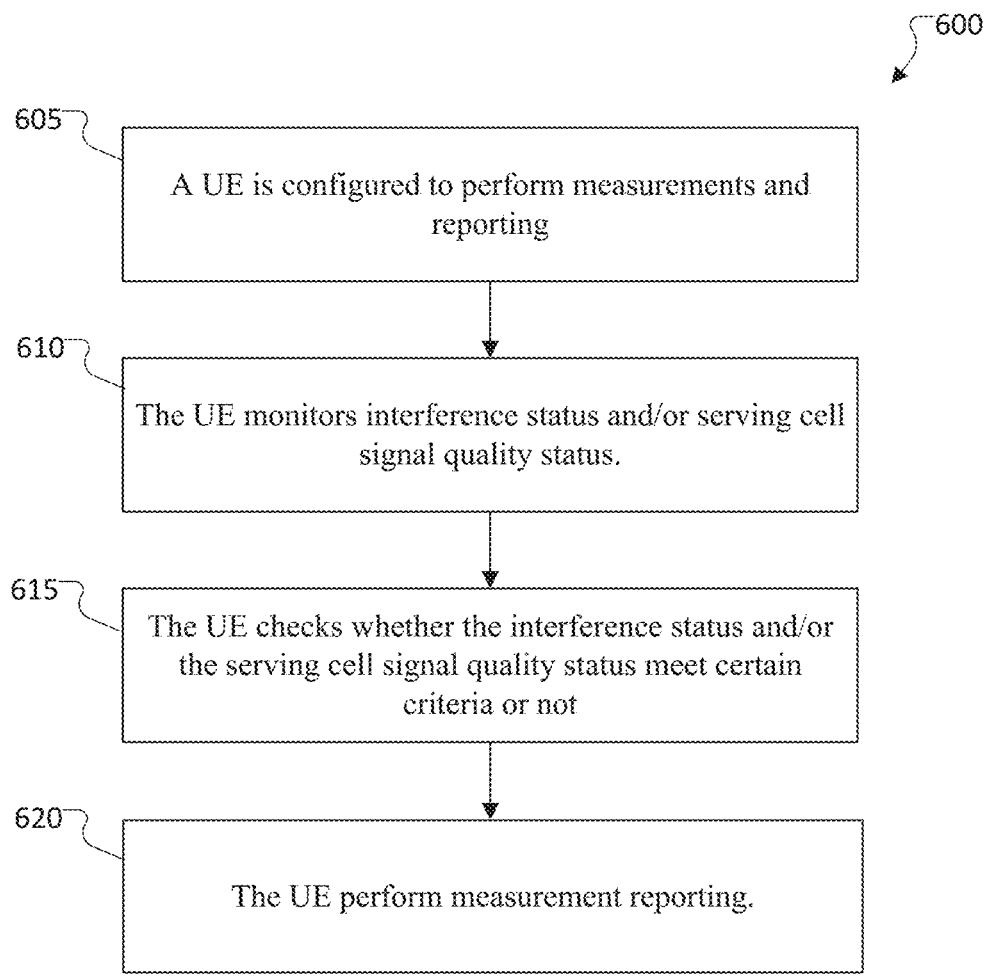
FIG. 6 illustrates a process for measurement and reporting according to embodiments of the present disclosure.

FIG. 6 illustrates a process for measurement and reporting according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE. Process 600 can be accomplished by, for example, UE 114, 115, and 116 in network 500.

At operation 605, UE 116 is configured to perform measurements and reporting. In one example, as described in Information Element MeasObjectNR in TS 38.331, information including SSB frequency, SSB subcarrier spacing, CSI-RS frequency, and/or physical cell ID can be configured for UE 116 to measure interference and/or serving cell signal qualities according to the configuration. In one example, as described in Information Element ReportConfigNR in TS 38.331, information including report type, report interval, report amount, trigger quantity, and/or report quantity can be configured for UE 116 to report measurement information according to the configuration. In another example, a configuration for measurements and reporting can be signaled/updated via L1 or L2 DL control, namely, PDCCH or MAC CE.

At operation 610, UE 116 monitors interference status and/or serving cell signal quality. In certain embodiments, UE 116 can monitor the change of interference levels, including RSRP and/or RSRQ, for neighboring BS(s), such as gNB 103, sharing the spectrum that the serving BS(s), such as gNB 102, uses in networks. In certain embodiments, UE 116 can monitor the change of serving cell signal qualities, including SINR, RSRQ, and/or RSRP. In certain embodiments, UE 116 can monitor both the changes of respective interference and serving cell signal qualities. In certain embodiments, UE 116 can monitor interference level and change of serving cell signal qualities.

At operation 615, UE 116 checks whether the interference status and/or serving cell signal quality status meet certain criteria or not. In certain embodiments, the criterion is a condition in which the change of interference levels is larger than a threshold value. In certain embodiments, the criterion is a condition in which the change of serving cell signal qualities is smaller than a first threshold value and the change of interference levels is larger than a second threshold value. In certain embodiments, the criterion is a condition in which interference is smaller than an adaptive threshold value, which can be updated based on serving cell signal quality status.

At operation 620, UE 116 performs measurement reporting. In certain embodiments, UE 116 reports the current interference status, the current serving cell signal quality status, or a combination thereof. In certain embodiments, UE 116 reports one or more of the current interference level, the serving cell signal quality, the change of the interference levels of the current and previous measurements, the change of the serving cell signal powers of the current and previous measurements, updated threshold value, of other measurement quantities including RSRQ, SINR, and so forth.

Figure 7:
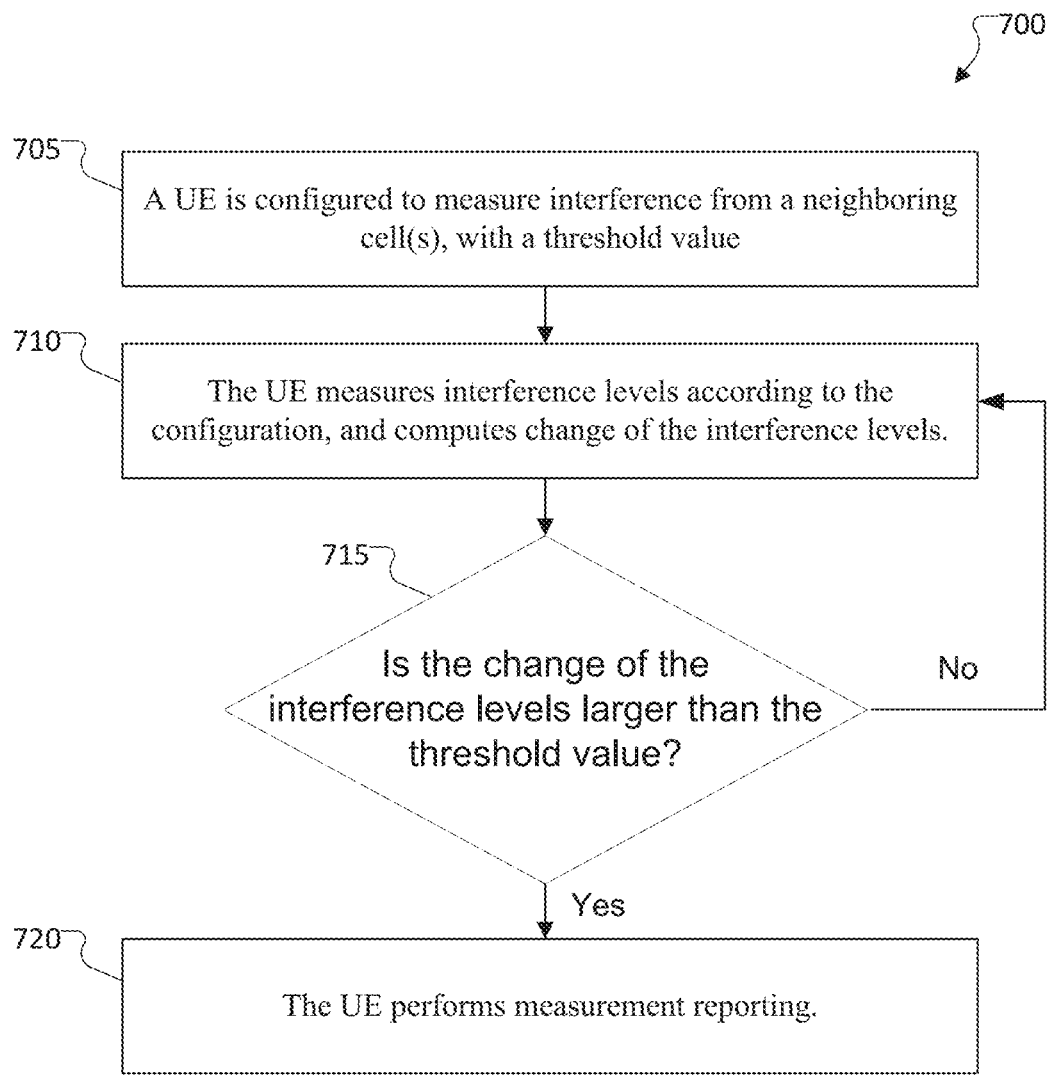
FIG. 7 illustrates measurement and reporting operation with a trigger based on a change of interference levels larger than a threshold value according to embodiments of the present disclosure.

FIG. 7 illustrates measurement and reporting operation with a trigger based on a change of interference levels larger than a threshold value according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE. Process 700 can be accomplished by, for example, UE 114, 115, and 116 in network 600.

At operation 705, UE 116 is configured to measure interference from a neighboring cell(s), such as gNB 103, with a threshold value. In certain embodiments, as described in Information Element MeasObjectNR in TS 38.331, information including SSB frequency, SSB subcarrier spacing, CSI-RS frequency, and/or physical cell ID can be configured for UE 116 to measure interference according to the configuration. In certain embodiments, as described in Information Element ReportConfigNR in TS 38.331, information including report type, report interval, report amount, trigger quantity, and/or report quantity can be configured for UE 116 to report measurement information according to the configuration. In certain embodiments, a configuration for measurements and reporting can be signaled/updated via L1 or L2 DL control, namely, a PDCCH or MAC CE.

At operation 710, UE 116 measures interference levels according to the configuration(s). UE 116 also computes a change of interference levels. In certain embodiments, the change of the interference levels can be according to Equation 1:

$$\Delta M_{interf} = M_{interf}^{current} - M_{interf}^{previous} \text{ [dB]} \quad (1)$$

where $M_{interf}^{current}$, $M_{interf}^{previous}$ are the RSRPs (or RSRQs) of interference of the current and previous measurements, respectively. In certain embodiments, $M_{interf}^{current}$, $M_{interf}^{previous}$ can be the layer-3 filtered outputs of the current and previous measurements, as described in Clause 5.5.3.2 of TS 38.331. In certain embodiments, the previous measurement $M_{interf}^{previous}$ is the latest measurement quantity excluding the current measurement quantity. That is, if there are several occurrences for interference measurement that are skipped (such as, not performed) due to other measurements or operations (such as, active BWP operations for intra-frequency measurements for the serving cell(s), gNB 102), the previous measurement $M_{interf}^{previous}$ can be the measurement quantity at the latest measurement occurrence before the skipped measurement occurrences. In certain embodiments, for the first (initial) measurement occurrence $M_{interf}^{previous}$ can be regarded as $M_{interf}^{current}$. In this case, $\Delta M_{interf}=0$.

At operation 715, UE 116 checks whether the change of interference levels is larger than (>), or larger than or equal to (≥) the threshold value or not. That is, UE 116 compares the change of the interference level against a first threshold value. In certain embodiments, UE 116 checks whether $|\Delta M_{interf}| > X_{TH}$ is satisfied or not, where $X_{TH}$ is the first threshold value. Here, the first threshold value can be configured as described in Information Element ReportConfigNR in TS. 38.331.

At operation 720, in response to the UE 116 determining that the change of the interference level is greater than (or greater than or equal to in certain embodiment) the first threshold, UE 116 performs measurement reporting. In certain embodiments, UE 116 can report the current interference measurement, the change of the interference levels of the current and previous measurements, and/or other measurement quantities including RSRQ, SINR, and so on according to the configuration.

If the UE 116 determines that the interference level is less than or equal to (or less than or equal to in certain embodiment) the first threshold in block 715, UE 116 can continue to perform measurement according to the configuration as in operation 710, or exit to perform measurement.

Figure 8:
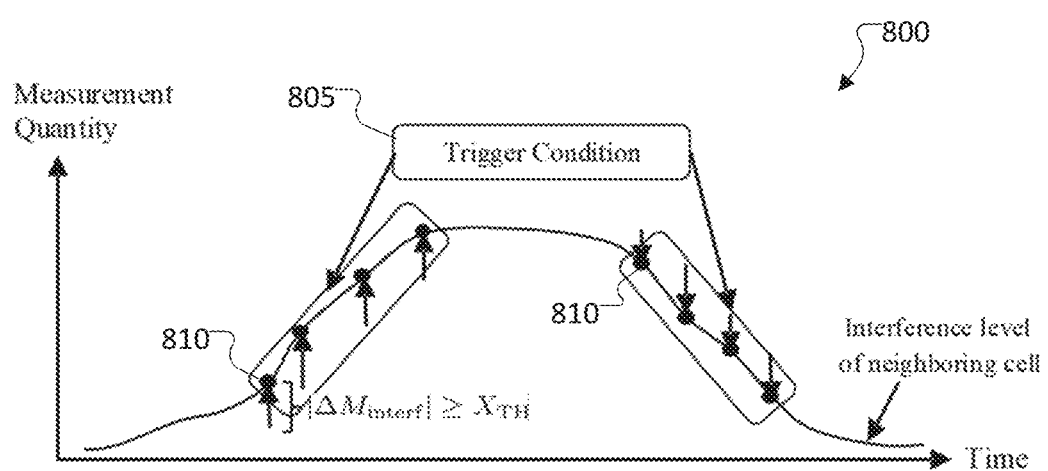
FIG. 8 illustrates an example of a report-triggering condition according to embodiments of the present disclosure.

FIG. 8 illustrates an example of report-triggering condition according to embodiments of the present disclosure. The embodiment of the report-triggering condition 800 shown in FIG. 8 is for illustration only. Other embodiments could be used without departing from the scope of the present disclosure.

In the example shown in FIG. 8, according to a triggering condition 805, UE 116 can be triggered to report 810 when (the absolute value of) the change of interference levels of the current and previous measurements for neighboring cell(s) is larger than or equal to a threshold value. Also, in this example, when triggered, UE 116 can report the change information (or other information including interference level) to gNB 103 to check interference circumstance from neighboring cell whether it is dropping or soaring drastically.

One realization of an embodiment is illustrated in TABLES 1, 2, 3, and 4 below. This realization is presented for illustration only and other illustrations could be utilized without departing from the scope of the present disclosure. Newly added/modified parameters or descriptions as compared to the original parameters and descriptions in TS 38.331 are highlighted in TABLES 1, 2, 3, and 4, respectively. In another realization, part of the parameters or descriptions can be removed and/or new parameters or descriptions can be added on the top of this realization in an appropriate manner.

A modified RRC Information Element ReportConfigNR of TS 38.331 for an embodiment is shown in TABLE 1. As shown in TABLE 1, SS-EventTriggerConfig, a parameter for a report-triggering event, is defined and contains event ID, RS type, report interval, report amount, and so on to specify configurations for event-triggering measurement reporting. As described in the parameter MeasTriggerQuantitySS, deltaRsrp, deltaRsrq, and/or deltaSinr are the trigger quantity parameters to be used for comparing with the changes of the current and previous RSRP, RSRQ, and/or SINR measurements for neighboring cell(s), respectively. Since the parameters indicate the change of the measurement quantities of the current and previous measurements, ranges for the parameters can be newly defined. In one example, DeltaRSRP-Range, DeltaRSRQ-Range, and DeltaSINR-Range can be specified as Integer(0, . . . , 31), and the actual value can be mapped to, e.g., (IE value−16) dB. In the parameter MeasReportQuanfitySS, as shown in TABLE 1, the changes of the current and previous RSRP, RSRQ, and/or SINR measurements (in addition to RSRP, RSRQ, and/or SINR measurement quantity itself) for neighboring cell(s) can be included in measurement reporting contents.

TABLE 1

A MODIFIED RRC INFORMATION ELEMENT REPORTCONFIGNR OF TS 38.331

```
ReportConfigNR ::=          SEQUENCE {
  reportType                CHOICE {
  ...
    ss-EventTriggered       SS-EventTriggerConfig,
  }
}
...
SS-EventTriggerConfig ::=   SEQUENCE {
  eventId                   CHOICE {
    eventS1                 SEQUENCE {
      s1-Threshold            MeasTriggerQuantitySS,
      reportOnLeave           BOOLEAN,
      hysteresis              ,
      timeToTrigger           ,
      useWhiteCellList        BOOLEAN
    },
    ...
  },
  rsType                    NR-RS-Type,
  reportInterval            ReportInterval,
  reportAmount              ENUMERATED {r1, r2, r4, r8,
                             r16, r32, r64, infinity},
  reportQuantityCell        MeasReportQuantitySS,
  maxReportCells            INTEGER (1..maxCellReport),
  ...
}
...
MeasTriggerQuantitySS ::=   CHOICE {
  deltaRsrp                 DeltaRSRP-Range,
  deltaRsrq                 DeltaRSRQ-Range,
  deltaSinr                 DeltaSINR-Range
}
...
MeasReportQuantitySS ::=    SEQUENCE {
  rsrp                      BOOLEAN,
  rsrq                      BOOLEAN,
  sinr                      BOOLEAN,
  DeltaRsrp                 BOOLEAN,
  DeltaRsrq                 BOOLEAN,
  DeltaSinr                 BOOLEAN
}
```

A modified procedure of performing measurements in Clause 5.5.3.1 of TS 38.331 for an embodiment is shown in TABLE 2. As shown in TABLE 2, the new event configuration parameter, SS-Event Triggered, is added as an additional condition in Step 2. In Steps 6 and 7 of TABLE 2, for each case of rsType set to csi-rs/ssb, the procedure to derive change of the measurement results (e.g., change of interference levels) is described when the MeasTriggerQuantitySS (defined in TABLE 1) is set to deltaRsrp, deltaRsrq, or deltaSinr.

TABLE 2

A MODIFIED PROCEDURE OF PERFORMING MEASUREMENTS IN CLAUSE 5.5.3.1 OF TS 38.331

1>for each measId included in the measIdList within VarMeasConfig:
  2>if the reportType for the associated reportConfig is periodical, eventTriggered, condTriggerConfig, or SS-Event Triggered:
    ...
    5>if the measObject is associated to NR and the rsType is set to csi-rs:
      ...
      6>if the trigger quantity (i.e., MeasTriggerQuantitySS) is set to deltaRsrp, deltaRsrq, or deltaSinr:
        7>derive change values of the cell measurement results based on CSI-RS using the previous and current measurement results

TABLE 2-continued

A MODIFIED PROCEDURE OF PERFORMING MEASUREMENTS IN CLAUSE 5.5.3.1 OF TS 38.331

5>if the measObject is associated to NR and the rsType is set to ssb:
      ...
      6>if the trigger quantity (i.e., MeasTriggerQuantitySS) is set to deltaRsrp, deltaRsrq, or deltaSinr:
        7>derive change values of the cell measurement results based on SS/PBCH block using the previous and current measurement results Other procedures in Clauses 5.5.4 and 5.5.5 of TS 38.331 can be modified in an appropriate manner that is according to the modifications shown in TABLES 1 and 2. Examples are shown in TABLES 3 and 4.

TABLE 3

A MODIFIED PROCEDURE FOR CONSIDERING CELLS IN CLAUSE 5.5.4.1 OF TS 38.331

1>for each measId included in the measIdList within VarMeasConfig:
  ...
  2>if the corresponding reportConfig includes a reportType set to ss-Event Triggered:
    3>if useWhiteCellList is set to true:
      4>consider any neighbouring cell detected based on parameters in the associated measObjectNR to be applicable when the concerned cell is included in the whiteCellsToAddModList defined within the VarMeasConfig for this measId;
    3>else:
      4>consider any neighbouring cell detected based on parameters in the associated measObjectNR to be applicable when the concerned cell is not included in the blackCellsToAddModList defined within the VarMeasConfig for this measId;

TABLE 4

A MODIFIED PROCEDURE OF MEASUREMENT REPORTING IN CLAUSE 5.5.5.1 OF TS 38.331

1>if there is at least one applicable neighbouring cell to report:
  2>if the reportType is set to event Triggered, periodical, or ss-Event Triggered:
    ...
    4>if the reportType is set to event Triggered or ss-Event Triggered:
      5>include the cells included in the cellsTriggeredList as defined within the VarMeasReportList for this measId;
    ...
    4>if the reportType is set to event Triggered, periodical, or ss-Event Triggered:
      ...
      7>if rsType in the associated reportConfig is set to ssb:
        8>set resultsSSB-Cell-SS within the measResult to include the SS/PBCH block based quantity(ies) indicated in the report QuantityCell within the concerned reportConfig, in decreasing order of the sorting quantity, determined as specified in 5.5.5.3, i.e. the most interference-affecting cell is included first;
      ...
      7>else if rsType in the associated reportConfig is set to csi-rs:
        8>set resultsCSI-RS-Cell-SS within the measResult to include the CSI-RS based quantity(ies) indicated in the reportQuantityCell within the concerned reportConfig, in decreasing order of the sorting quantity, determined as specified in 5.5.5.3, i.e. the most interference-affecting cell is included first;
      ...

One realization of an embodiment can be illustrated in TABLES 5 and 6. This realization is an example of an embodiment so should not be interpreted as a normative. Newly added/modified parameters or descriptions compared to the original ones in TS 38.331 are highlighted in TABLES 5 and 6, respectively. In another realization, part of the parameters or descriptions can be removed and/or new parameters or descriptions can be added on the top of this realization in an appropriate manner.

A modified RRC Information Element ReportConfigNR of TS 38.331 for an embodiment is shown in TABLE 5. As shown in TABLE 5, eventA7 is added in EventTriggerConfig as a new report-triggering event. As described in the parameter MeasTriggerQuantity, deltaRsrp, deltaRsrq, and/or deltaSinr are added and the trigger quantity parameters to be used for comparing with the changes of the current and previous RSRP, RSRQ, and/or SINR measurements for neighboring cell(s), respectively. Since the parameters indicate the change of the measurement quantities of the current and previous measurements, ranges for the parameters can be newly defined. In one example, DeltaRSRP-Range, DeltaRSRQ-Range, and DeltaSINR-Range can be specified as Integer (0, . . . , 31), and the actual value can be mapped to, e.g., (IE value−16) dB. In the parameterMeasReportQuantity, as shown in TABLE 5, the changes of the current and previous RSRP, RSRQ, and/or SINR measurements for neighboring cell(s) can be included in measurement reporting contents.

TABLE 5

A MODIFIED RRC INFORMATION ELEMENT REPORTCONFIGNR OF TS 38.331

```
-- ASN1START
-- TAG-REPORTCONFIGNR-START
ReportConfigNR ::=          SEQUENCE {
    reportType              CHOICE {
        periodical          PeriodicalReportConfig,
        eventTriggered      EventTriggerConfig,
        ...,
    }
}
...
EventTriggerConfig::=       SEQUENCE {
    eventId                 CHOICE {
        ...
        eventA7             SEQUENCE{
            a7-threshold        MeasTriggerQuantity,
            reportOnLeave       BOOLEAN,
            hysteresis          Hysteresis,
            timeToTrigger       TimeToTrigger,
            useWhiteCellList    BOOLEAN
        },
    },
...
MeasTriggerQuantity ::=     CHOICE {
    rsrp                    RSRP-Range,
    rsrq                    RSRQ-Range,
    sinr                    SINR-Range,
    deltaRsrp               DeltaRSRP-Range,
    deltaRsrq               DeltaRSRQ-Range,
    deltaSinr               DeltaSINR-Range
}
...
MeasReportQuantity ::=      SEQUENCE {
    rsrp                    BOOLEAN,
    rsrq                    BOOLEAN,
    sinr                    BOOLEAN,
    DeltaRsrp               BOOLEAN,
```

TABLE 5-continued

A MODIFIED RRC INFORMATION ELEMENT REPORTCONFIGNR OF TS 38.331

```
    DeltaRsrq               BOOLEAN,
    DeltaSinr               BOOLEAN
}
...
```

A modified procedure of performing measurements in Clause 5.5.3.1 of TS 38.331 for an embodiment is shown in TABLE 6. As shown in TABLE 6, in Steps 6 and 7 for each case of rsType set to csi-rs/ssb, an example procedure to derive change of the measurement results (e.g., change of interference levels) is described when the MeasTriggerQuantity (defined in TABLE 5) is set to deltaRsrp, deltaRsrq, deltaSinr.

TABLE 6

A MODIFIED PROCEDURE OF PERFORMING MEASUREMENTS IN CLAUSE 5.5.3.1 OF TS 38.331

2>if the reportType for the associated reportConfig is periodical, eventTriggered or condTriggerConfig:

. . .

5>if the measObject is associated to NR and the rsType is set to csi-rs:

. . .

6>if the trigger quantity (i.e., MeasTriggerQuantity) is set to deltaRsrp, deltaRsrq, or deltaSinr:

7>derive change values of the cell measurement results based on CSI-RS using the previous and current measurement results 5>if the measObject is associated to NR and the rsType is set to ssb:

. . .

6>if the trigger quantity (i.e., MeasTriggerQuantity) is set to deltaRsrp, deltaRsrq, or deltaSinr:

7>derive change values of the cell measurement results based on SS/PBCH block using the previous and current measurement results Definitions of Delta RSRP/RSRQ/SINR TABLES 7, 8, 9, 10, 11, and 12 show examples of definitions of Delta-SS-RSRP, Delta-CSI-RSRP, Delta-SS-RSRQ, Delta-CSI-RSRQ, Delta-SS-SINR, and Delta-CSI-SINR, respectively, which define the change of the quantities measured at the current and previous measurements for each measurement-quantity type for each resource type. According to the definitions, UE derives the change of the measurement quantities. For example, when rsType is set to csi-rs and MeasTriggerQuantity is set to deltaRsrp in Steps 5 and 6 of TABLE 6, UE 116 will derive the change values of the cell measurement quantities in Step 7 of TABLE 6, according to the definition described in TABLE 8.

TABLE 7

NEW DEFINITION OF THE CHANGE OF REFERENCE SIGNAL RECEIVED POWERS FOR SS/PBCH BLOCK, TO BE ADDED IN CLAUSE 5.1 OF TS 38.215
Delta SS reference signal received power (Delta-SS-RSRP)

| | |
|---|---|
| Definition | Delta-SS reference signal received power (Delta-SS-RSRP or $\Delta$SS-RSRP) is defined as the difference in decibels (dB) scale between $SS\text{-}RSRP_{current}$ and $SS\text{-}RSRP_{previous}$, i.e., $\Delta SS\text{-}RSRP = SS\text{-}RSRP_{current} - SS\text{-}RSRP_{previous}$ [dB], where the $SS\text{-}RSRP_{current}$ is the SS-RSRP measured at the current measurement period and the $SS\text{-}RSRP_{previous}$ is the SS-RSRP measured at the previous measurement period, when the measurement periodicity is configured. For intra-frequency measurements, if the measurement is not performed at the previous measurement period due to other operations, $SS\text{-}RSRP_{previous}$ is defined as the SS-RSRP at the latest measurement prior to the current measurement, and $\Delta SS\text{-}RSRP$ is defined as $\Delta SS\text{-}RSRP = (SS\text{-}RSRP_{current} - SS\text{-}RSRP_{previous})/N$ [dB], where N is the number of period cycles between the $SS\text{-}RSRP_{current}$ and $SS\text{-}RSRP_{previous}$ measurements. |
| Applicable for | RRC_IDLE intra-frequency, RRC_IDLE inter-frequency, RRC_INACTIVE intra-frequency, RRC_INACTIVE inter-frequency, RRC_CONNECTED intra-frequency, RRC_CONNECTED inter-frequency |

TABLE 8

NEW DEFINITION OF THE CHANGE OF REFERENCE SIGNAL RECEIVED POWERS FOR CSI REFERENCE SIGNALS, TO BE ADDED IN CLAUSE 5.1 OF TS 38.215
Delta CSI reference signal received power (Delta-CSI-RSRP)

| | |
|---|---|
| Definition | Delta-CSI reference signal received power (Delta-CSI-RSRP or $\Delta$CSI-RSRP) is defined as the difference in dB scale between $CSI\text{-}RSRP_{current}$ and $CSI\text{-}RSRP_{previous}$, i.e., $\Delta CSI\text{-}RSRP = CSI\text{-}RSRP_{current} - CSI\text{-}RSRP_{previous}$ [dB], where the $CSI\text{-}RSRP_{current}$ is the CSI-RSRP measured at the current measurement period and the $CSI\text{-}RSRP_{previous}$ is the CSI-RSRP measured at the previous measurement period, when the measurement periodicity is configured. For intra-frequency measurements, if the measurement is not performed at the previous measurement period due to other operations, $CSI\text{-}RSRP_{previous}$ is defined as the CSI-RSRP at the latest measurement prior to the current measurement, and $\Delta CSI\text{-}RSRP$ is defined as $\Delta CSI\text{-}RSRP = (CSI\text{-}RSRP_{current} - CSI\text{-}RSRP_{previous})/N$ [dB], where N is the number of period cycles between the $CSI\text{-}RSRP_{current}$ and $CSI\text{-}RSRP_{previous}$ measurements. |
| Applicable for | RRC_CONNECTED intra-frequency, RRC_CONNECTED inter-frequency |

TABLE 9

NEW DEFINITION OF THE CHANGE OF REFERENCE SIGNAL RECEIVED QUALITIES FOR SS-PBCH BLOCK, TO BE ADDED IN CLAUSE 5.1 OF TS 38.215
Delta SS reference signal received quality (Delta-SS-RSRQ)

| | |
|---|---|
| Definition | Delta-SS reference signal received quality (Delta-SS-RSRQ or $\Delta$SS-RSRQ) is defined as the difference in dB scale between $SS\text{-}RSRQ_{current}$ and $SS\text{-}RSRQ_{previous}$, i.e., $\Delta SS\text{-}RSRQ = SS\text{-}RSRQ_{current} - SS\text{-}RSRQ_{previous}$ [dB], where the $SS\text{-}RSRQ_{current}$ is the SS-RSRQ measured at the current measurement period and the $SS\text{-}RSRQ_{previous}$ is the SS-RSRQ measured at the previous measurement period, when the measurement periodicity is configured. |

TABLE 9-continued

NEW DEFINITION OF THE CHANGE
OF REFERENCE SIGNAL RECEIVED QUALITIES
FOR SS-PBCH BLOCK, TO BE ADDED IN
CLAUSE 5.1 OF TS 38.215
Delta SS reference signal received quality (Delta-SS-RSRQ)

|  |  |
|---|---|
|  | For intra-frequency measurements, if the measurement is not performed at the previous measurement period due to other operations, $SS\text{-}RSRQ_{previous}$ is defined as the SS-RSRQ at the latest measurement prior to the current measurement, and $\Delta SS\text{-}RSRQ$ is defined as $\Delta SS\text{-}RSRQ = (SS\text{-}RSRQ_{current} - SS\text{-}RSRQ_{previous})/N$ [dB], where N is the number of period cycles between the $SS\text{-}RSRQ_{current}$ and $SS\text{-}RSRQ_{previous}$ measurements. |
| Applicable for | RRC_IDLE intra-frequency, RRC_IDLE inter-frequency, RRC_INACTIVE intra-frequency, RRC_INACTIVE inter-frequency, RRC_CONNECTED intra-frequency, RRC_CONNECTED inter-frequency |

TABLE 10

NEW DEFINITION OF THE CHANGE
OF REFERENCE SIGNAL RECEIVED QUALITIES
FOR CSI REFERENCE SIGNALS, TO BE ADDED IN
CLAUSE 5.1 OF TS 38.215
Delta CSI reference signal received quality (Delta-CSI-RSRQ)

|  |  |
|---|---|
| Definition | Delta-CSI reference signal received quality (Delta-CSI-RSRQ or $\Delta$CSI-RSRQ) is defined as the difference in dB scale between $CSI\text{-}RSRQ_{current}$ and $CSI\text{-}RSRQ_{previous}$, i.e., $\Delta CSI\text{-}RSRQ = CSI\text{-}RSRQ_{current} - CSI\text{-}RSRQ_{previous}$ [dB], where the $CSI\text{-}RSRQ_{current}$ is the CSI-RSRQ measured at the current measurement period and the $CSI\text{-}RSRQ_{previous}$ is the CSI-RSRQ measured at the previous measurement period, when the measurement periodicity is configured. For intra-frequency measurements, if the measurement is not performed at the previous measurement period due to other operations, $CSI\text{-}RSRQ_{previous}$ is defined as the CSI-RSRQ at the latest measurement prior to the current measurement, and $\Delta CSI\text{-}RSRQ$ is defined as $\Delta CSI\text{-}RSRQ = (CSI\text{-}RSRQ_{current} - CSI\text{-}RSRQ_{previous})/N$ [dB], where N is the number of period cycles between the $CSI\text{-}RSRQ_{current}$ and $CSI\text{-}RSRQ_{previous}$ measurements. |
| Applicable for | RRC_CONNECTED intra-frequency, RRC_CONNECTED inter-frequency |

TABLE 11

NEW DEFINITION OF THE CHANGE
OF SIGNAL-TO-NOISE AND INTERFERENCE
RATIO FOR SS-PBCH BLOCK, TO BE ADDED IN
CLAUSE 5.1 OF TS 38.215
Delta SS signal-to-noise and interference ratio (Delta-SS-SINR)

|  |  |
|---|---|
| Definition | Delta-SS signal-to-noise and interference ratio (Delta-SS-SINR or $\Delta$SS-SINR) is defined as the difference in dB scale between $SS\text{-}SINR_{current}$ and $SS\text{-}SINR_{previous}$, i.e., $\Delta SS\text{-}RSRQ = SS\text{-}RSRQ_{current} - SS\text{-}RSRQ_{previous}$ [dB], where the $SS\text{-}SINR_{current}$ is the SS-SINR measured at the current measurement period and the $SS\text{-}SINR_{previous}$ is the SS-SINR measured at the previous measurement period, when the measurement periodicity is configured. For intra-frequency measurements, if the measurement is not performed at the previous measurement period due to other operations, $SS\text{-}SINR_{previous}$ is defined as the SS-SINR at the latest measurement prior to the current measurement, and $\Delta SS\text{-}SINR$ is defined as $\Delta SS\text{-}SINR = (SS\text{-}SINR_{current} - SS\text{-}SINR_{previous})/N$ [dB], where N is the number of period cycles between the $SS\text{-}SINR_{current}$ and $SS\text{-}SINR_{previous}$ measurements. |
| Applicable for | RRC_IDLE intra-frequency, RRC_IDLE inter-frequency, |

TABLE 11-continued

NEW DEFINITION OF THE CHANGE
OF SIGNAL-TO-NOISE AND INTERFERENCE
RATIO FOR SS-PBCH BLOCK, TO BE ADDED IN
CLAUSE 5.1 OF TS 38.215
Delta SS signal-to-noise and interference ratio (Delta-SS-SINR)

RRC_INACTIVE intra-frequency,
RRC_INACTIVE inter-frequency,
RRC_CONNECTED intra-frequency,
RRC_CONNECTED inter-frequency

TABLES 12

NEW DEFINITION OF THE CHANGE OF
SIGNAL-TO-NOISE AND INTERFERENCE
RATIO FOR CSI REFERENCE SIGNALS, TO BE ADDED IN
CLAUSE 5.1 OF TS 38.215
Delta CSI signal-to-noise and interference ratio (Delta-CSI-SINR)

| | |
|---|---|
| Definition | Delta-CSI signal-to-noise and interference ratio (Delta-CSI-SINR or $\Delta$CSI-SINR) is defined as the difference in dB scale between CSI-SINR$_{current}$ and CSI-SINR$_{previous}$, i.e., $\Delta$CSI-SINR = CSI-SINR$_{current}$ − CSI-SINR$_{previous}$ [dB], where the CSI-SINR$_{current}$ is the CSI-SINR measured at the current measurement period and the CSI-SINR$_{previous}$ is the CSI-SINR measured at the previous measurement period, when the measurement periodicity is configured. For intra-frequency measurements, if the measurement is not performed at the previous measurement period due to other operations, CSI-SINR$_{previous}$ is defined as the CSI-SINR at the latest measurement prior to the current measurement, and $\Delta$CSI-SINR is defined as $\Delta$CSI-SINR = (CSI-SINR$_{current}$ − CSI-SINR$_{previous}$)/N [dB], where N is the number of period cycles between the CSI-SINR$_{current}$ and CSI-SINR$_{previous}$ measurements. |
| Applicable for | RRC_CONNECTED intra-frequency, RRC_CONNECTED inter-frequency |

In one realization of an embodiment, new report triggering events can be defined as illustrated in TABLES 13, 14, and 15. TABLE 13 shows an example of new event description for the case in which UE 116 enters or leaves the triggering condition with respect to the criteria, whether the absolute change of interference levels becomes larger than a threshold or not. Since TABLE 13 considers the absolute change of interference levels as a trigger quantity, it can trigger measurement reporting for both the cases that interference increases and decreases by a certain amount of change. TABLES 14 and 15 show examples of new event descriptions for both cases, respectively, while considering each individual case as a separate event for measurement report triggering.

TABLE 13

AN EXAMPLE OF NEW EVENT DESCRIPTION IN
MEASUREMENT REPORT
TRIGGERING OF CLAUSE 5.5.4 OF TS 38.331

(the absolute change of interference becomes larger than threshold)
The UE shall:
1>consider the entering condition for this event to be satisfied when condition S1-1, as specified below, is fulfilled;
1>consider the leaving condition for this event to be satisfied when condition S1-2, as specified below, is fulfilled.
Inequality S1-1 (Entering condition)
|DeltaMn| + Ofn + Ocn − Hys > Thresh
Inequality S1-2 (Leaving condition)
|DeltaMn| + Ofn + Ocn+ Hys <Thresh
The variables in the formula are defined as follows:
DeltaMn is the change of the measurement results at the current and

TABLE 13-continued

AN EXAMPLE OF NEW EVENT DESCRIPTION IN
MEASUREMENT REPORT
TRIGGERING OF CLAUSE 5.5.4 OF TS 38.331 previous measurements for the neighbouring cell, not taking into account any offsets.
Ofn is the measurement object specific offset of the neighbour cell (i.e. offsetMO as defined within measObjectNR corresponding to the neighbour cell).
Ocn is the measurement object specific offset of the neighbour cell (i.e. cellIndividualOffset as defined within measObjectNR corresponding to the neighbour cell), and set to zero if not configured for the neighbour cell.
Hys is the hysteresis parameter for this event (i.e. hysteresis as defined within reportConfigNR for this event).
Thresh is the threshold parameter for this event (i.e. s1-Threshold as defined within reportConfigNR for this event).
All parameters are expressed in dB.

TABLE 14

AN EXAMPLE OF NEW EVENT DESCRIPTION IN
MEASUREMENT REPORT
TRIGGERING OF CLAUSE 5.5.4 OF TS 38.331

(Interference increases by certain amount of change)
The UE shall:
1>consider the entering condition for this event to be satisfied when condition S1-1, as specified below, is fulfilled;
1>consider the leaving condition for this event to be satisfied when condition S1-2, as specified below, is fulfilled.
Inequality S1-1 (Entering condition)

TABLE 14-continued

AN EXAMPLE OF NEW EVENT DESCRIPTION IN
MEASUREMENT REPORT
TRIGGERING OF CLAUSE 5.5.4 OF TS 38.331

DeltaMn + Ofn + Ocn − Hys > Thresh
Inequality S1-2 (Leaving condition)
DeltaMn + Ofn + Ocn + Hys < Thresh
The variables in the formula are defined as follows:
DeltaMn is the change of the measurement results at the current and
previous measurements of the neighbouring cell, not taking into
account any offsets.
Ofn is the measurement object specific offset of the neighbour cell
(i.e. offsetMO as defined within measObjectNR corresponding to
the neighbour cell).
Ocn is the measurement object specific offset of the neighbour cell
(i.e. cellIndividualOffset as defined within measObjectNR
corresponding to the neighbour cell), and set to zero if not configured
for the neighbour cell.
Hys is the hysteresis parameter for this event (i.e. hysteresis as defined
within reportConfigNR for this event).
Thresh is the threshold parameter for this event (i.e. s1-Threshold as
defined within reportConfigNR for this event).
All parameters are expressed in dB.

TABLE 15

AN EXAMPLE OF NEW EVENT DESCRIPTION IN
MEASUREMENT REPORT
TRIGGERING OF CLAUSE 5.5.4 OF TS 38.331

(Interference decreases by certain amount of change)
The UE shall:
1>consider the entering condition for this event to be satisfied
when condition S1-1, as specified below, is fulfilled;
1>consider the leaving condition for this event to be satisfied
when condition S1-2, as specified below, is fulfilled.
Inequality S1-1 (Entering condition)
DeltaMn + Ofn + Ocn − Hys < Thresh
Inequality S1-2 (Leaving condition)
DeltaMn + Ofn + Ocn + Hys > Thresh
The variables in the formula are defined as follows:
DeltaMn is the change of the measurement results at the current and
previous measurements of the neighbouring cell, not taking into
account any offsets.
Ofn is the measurement object specific offset of the neighbour cell
(i.e. offsetMO as defined within measObjectNR corresponding to the
neighbour cell).
Ocn is the measurement object specific offset of the neighbour cell
(i.e. cellIndividualOffset as defined within measObjectNR
corresponding to the neighbour cell), and set to zero if not configured
for the neighbour cell.
Hys is the hysteresis parameter for this event (i.e. hysteresis as defined
within reportConfigNR for this event).
Thresh is the threshold parameter for this event (i.e. s1-Threshold as
defined within reportConfigNR for this event).
All parameters are expressed in dB.

Figure 9:
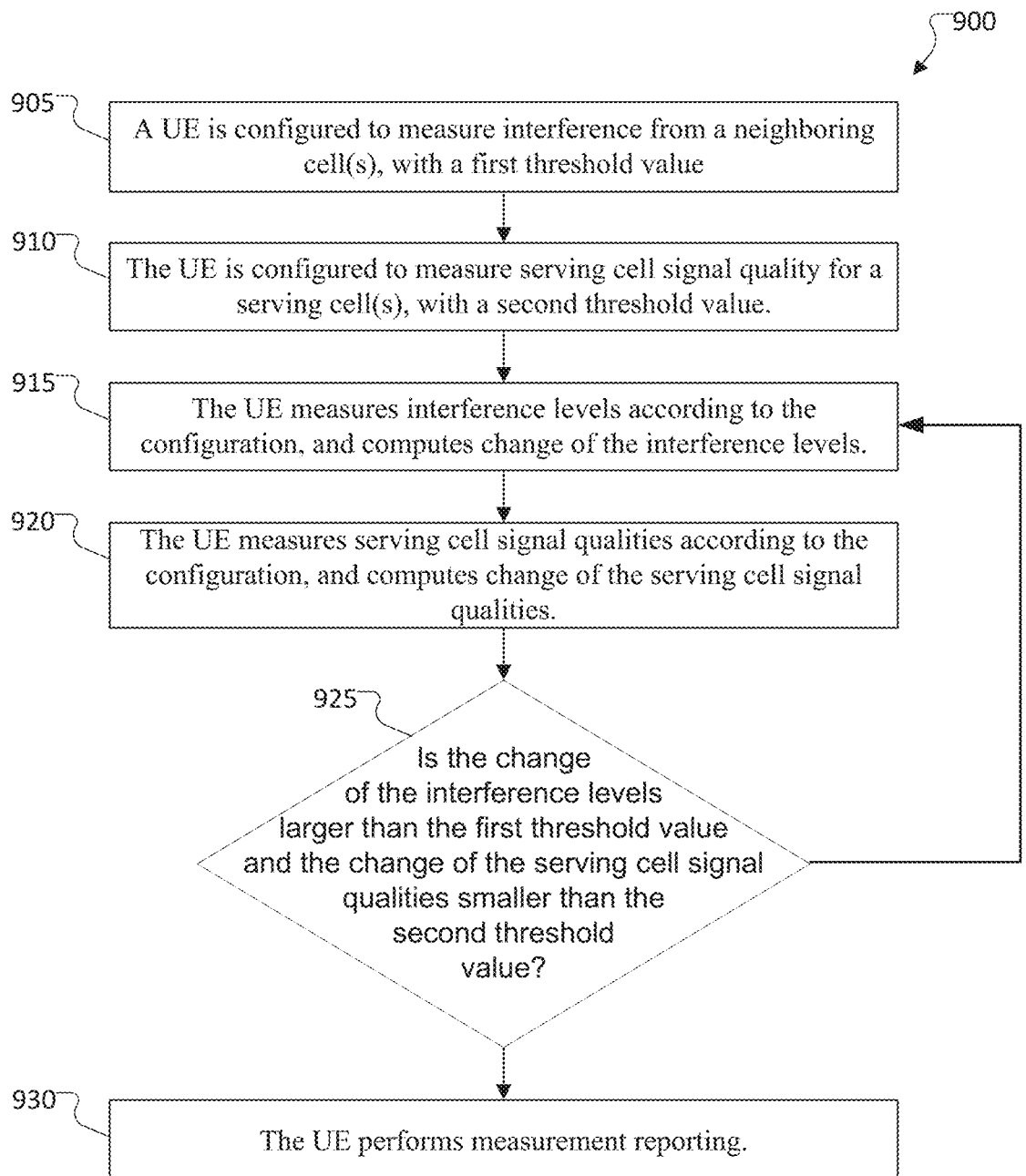
FIG. 9 illustrates measurement and reporting operation with a trigger based on a change of interference levels larger than a threshold value according to embodiments of the present disclosure.

FIG. 9 illustrates measurement and reporting operation with a trigger based on a change of interference levels larger than a threshold value according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE. Process 900 can be accomplished by, for example, UE 114, 115, and 116 in network 600.

At operation 905, UE 116 is configured to measure interference a neighboring cell(s), with a first threshold value. At operation 910, UE 116 is configured to measure serving cell signal quality for a serving cell(s), with a second threshold value. In one example, as described in Information Element MeasObjectNR in TS 38.331, information including SSB frequency, SSB subcarrier spacing, CSI-RS frequency, and/or physical cell ID can be configured for UE 116 to measure interference and serving cell signal quality according to the configuration. In one example, as described in Information Element ReportConfigNR in TS 38.331, information including report type, report interval, report amount, trigger quantity, and/or report quantity can be configured for UE 116 to report measurement information according to the configuration. In another example, a configuration for measurements and reporting can be signaled/updated via L1 or L2 DL control (i.e., PDCCH or MAC CE).

At operation 915, UE 116 measures interference levels according to the configuration(s), and computes change of the interference levels. In one example, the change of the interference levels can be:

$$\Delta M_{interf} = M_{interf}^{current} - M_{interf}^{previous} \text{ [dB]}, \quad (2)$$

where $M_{interf}^{current}$, $M_{interf}^{previous}$ are the RSRPs (or RSRQs) of interference at the current and previous measurements, respectively. Here, in another example, $M_{interf}^{current}$, $M_{interf}^{previous}$ can be the layer-3 filtered outputs of the current and previous measurements, as described in Clause 5.5.3.2 of TS 38.331. In one example, the previous measurement $M_{interf}^{previous}$ can be defined as the latest measurement quantity excluding the current measurement quantity. In other words, if there were several occurrences for interference measurement that are skipped (not performed) due to other measurements or operations (such as active BWP operations for intra-frequency measurements for the serving cell(s)), the previous measurement $M_{interf}^{previous}$ can be the measurement quantity at the latest measurement occurrence before the skipped measurement occurrences. In another example, for the first (initial) measurement occurrence, $M_{interf}^{previous}$ can be regarded as $M_{interf}^{current}$. In this case $\Delta M_{interf}=0$. At operation 920, UE 116 measures serving cell signal qualities according to the configuration(s), and computes change of the serving cell signal qualities. In one example, the change of the serving cell signal qualities can be:

$$\Delta M_{serv} = M_{serv}^{current} - M_{serv}^{previous} \text{ [dB]}, \quad (3)$$

where $M_{serv}^{current}$, $M_{serv}^{previous}$ are the RSRPs, RSRQs, or SINRs of serving cell at the current and previous measurements, respectively. Here, in another example $M_{serv}^{current}$, $M_{serv}^{previous}$ can be the layer-3 filtered outputs of the current and previous measurements, as described in Clause 5.5.3.2 of TS 38.331. In one example, the previous measurement $M_{serv}^{previous}$ can be defined as the latest measurement quantity excluding the current measurement quantity. In other words, if there are several occurrences for serving cell quality measurement that are skipped (not performed) due to other measurements or operations (such as active BWP operations for intra-frequency measurements for the serving cell(s)), the previous measurement $M_{serv}^{previous}$ can be the measurement quantity at the latest measurement occurrence before the skipped occurrences. In another example, for the first measurement occurrence, $M_{serv}^{previous}$ can be regarded as $M_{serv}^{current}$. In this case, $\Delta M_{serv}=0$. At operation 925, the UE determines whether the triggering condition is met based on whether the change of interference levels is larger than the first threshold value and the change of serving cell signal qualities is smaller than the second threshold values. In certain embodiments, UE 116 determines whether the triggering condition is met based on whether the change of interference levels is larger than or equal to (≥) the first threshold and the change of serving cell signal qualities is smaller than or equal to (≤) the second threshold. In one example, the UE can check whether the condition that $|\Delta M_{interf}|>X_{TH,1}$ and $|\Delta M_{serv}|<X_{TH,2}$ is satisfied or not, where $X_{TH,1}$, $X_{TH,2}$ are the first and second threshold values, respectively. Here, the first and second threshold values can be differently configured as described in Information Element ReportConfigNR in TS. 38.331. In response to the UE determining that the triggering condition is met in operation 925, UE 116 performs measurement reporting in operation 930. In one example, UE 116 can report the current interference measurement, the change of the interference levels of the current and previous measurements, the current serving cell signal qualities, the change of the serving cell signal qualities of the current and previous measurements, and/or other measurement quantities including RSRQ, SINR, and so on. When UE 116 determines, in operation 925, that the triggering condition has not been met, UE 116 can continue to perform measurement according to the configuration in operations 915/920, or exit to perform measurement.

Figure 10:
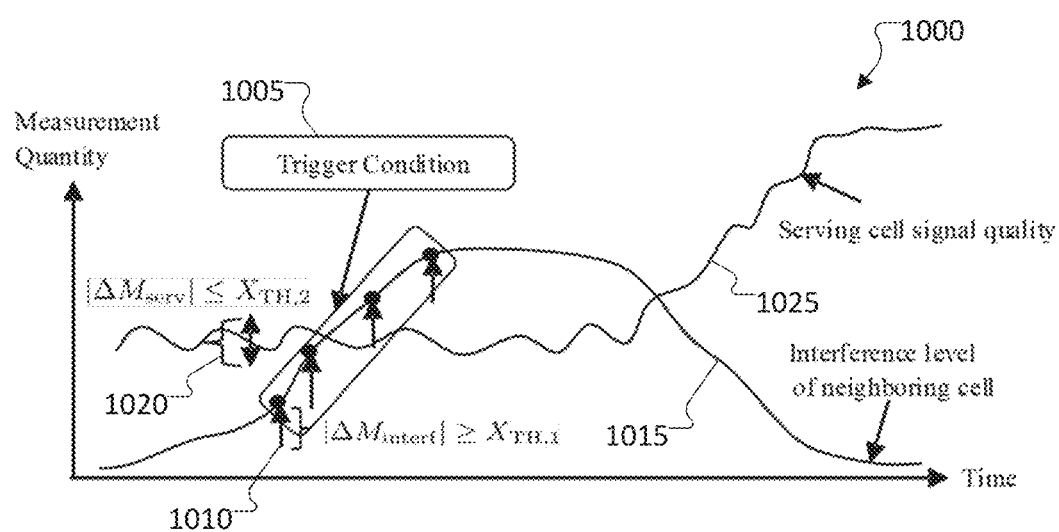
FIG. 10 illustrates a report triggering condition based on two thresholds according to embodiments of the present disclosure.

FIG. 10 illustrates a report triggering condition based on two thresholds according to embodiments of the present disclosure. The embodiment of the report-triggering condition 1000 shown in FIG. 10 is for illustration only. Other embodiments could be used without departing from the scope of the present disclosure.

In the example shown in FIG. 10, according to a triggering condition 1005, UE 116 is triggered to report 1010 when (the absolute value of) the change of interference levels of the current and previous measurements for neighboring cell 1015 is larger than or equal to a first threshold value (called Condition 1) and (the absolute value of) the change of serving cell signal qualities of the current and previous measurements is smaller than or equal to a second threshold value (called Condition 2). In this example, the right part 1020 of the trigger condition 1005 that is not the triggering condition, since the change of serving cell qualities 1025 between the current and previous measurements is larger than the second threshold value. The rationale for conditioning that the change of the serving cell signal powers is smaller than or equal to the threshold (i.e., Condition 2) in addition to Condition 1 is for gNB 103 to notice interference circumstance whether it is dropping or soaring, under guaranteeing UE 103 is static in some degree.

Certain sub-embodiments can be illustrated in TABLES 16, 17, 18, 3, and 4. This realization is an example presented for illustration only and should not be interpreted as normative operations. Newly added/modified parameters or descriptions compared to the original ones in TS 38.331 are highlighted in TABLES 16, 17, 18, 3, and 4, respectively. In another realization, part of the parameters or descriptions can be removed and/or new parameters or descriptions can be added on the top of this realization in an appropriate manner.

A modified RRC Information Element ReportConfigNR of TS 38.331 for a sub-embodiment is shown in TABLE 16. As shown in TABLE 16, SS-EventTriggerConfig, a parameter for a report-triggering event, is defined and it contains event ID, RS type, report interval, report amount, and so on to specify configurations for event-triggering measurement reporting. As described in the parameter MeasTriggerQuantitySS, deltaRsrp, deltaRsrq, and/or deltaSinr are the trigger quantity parameters to be used for comparing with the changes of the current and previous RSRP, RSRQ, and/or SINR measurements for serving and/or neighboring cell(s), respectively. Since the parameters indicate the change of the measurement quantities of the current and previous measurements, ranges for the parameters can be newly defined. In one example, DeltaRSRP-Range, DeltaRSRQ-Range, and DeltaSINR-Range can be specified as Integer(0, . . . , 31), and the actual value can be mapped to, for example, (information element (IE) value−16) dB. In the parameter-MeasReportQuantitySS, as shown in TABLE 16, the changes of the current and previous RSRP, RSRQ, and/or SINR measurements (in addition to RSRP, RSRQ, and/or SINR measurement quantity itself) for serving and/or neighboring cells can be included in measurement reporting contents. As described in the parameter eventS2 of TABLE 16, two threshold values are defined to compare with the changes of the interference levels and serving cell signal qualities of the current and previous measurements, respectively.

TABLE 16

A MODIFIED RRC INFORMATION
ELEMENT REPORTCONFIGNR OF
TS 38.331

| | |
|---|---|
| ReportConfigNR ::= | SEQUENCE { |
| reportType | CHOICE { |
| . . . | |
| ss-EventTriggered | SS-EventTriggerConfig, |
| } | |
| } | |
| . . . | |
| SS-EventTriggerConfig ::= | SEQUENCE { |
| eventId | CHOICE { |
| eventS2 | SEQUENCE { |
| s2-Threshold1 | MeasTriggerQuantitySS, |
| s2-Threshold2 | MeasTriggerQuantitySS, |
| reportOnLeave | BOOLEAN, |
| hysteresisN | Hysteresis, |
| hysteresisP | Hysteresis, |
| timeToTrigger | TimeToTrigger, |
| useWhiteCellList | BOOLEAN |
| }, | |
| ... | |
| }, | |
| rsType | NR-RS-Type, |
| reportInterval | ReportInterval, |
| reportAmount | ENUMERATED {r1, r2, r4, r8, r16, r32, r64, infinity}, |
| reportQuantityCell | MeasReportQuantitySS |
| maxReportCells | INTEGER (1..maxCellReport), |
| ... | |
| } | |
| . . . | |
| MeasTriggerQuantitySS ::= | CHOICE { |
| deltaRsrp | DeltaRSRP-Range, |
| deltaRsrq | DeltaRSRQ-Range, |
| deltaSinr | DeltaSINR-Range |
| } | |
| . . . | |
| MeasReportQuantitySS ::= | SEQUENCE { |
| rsrp | BOOLEAN, |
| rsrq | BOOLEAN, |
| sinr | BOOLEAN, |
| DeltaRsrp | BOOLEAN, |
| DeltaRsrq | BOOLEAN, |
| DeltaSinr | BOOLEAN |
| } | |

In certain sub-embodiments, parameter sDelta-MeasureConfig can be defined as illustrated in TABLE 17. deltaSsb-RSRP, deltaCsi-RSRP, deltaSsb-RSRQ, deltaCsi-RSRQ, deltaSsb-SINR, and deltaCsi-SINR are the trigger quantities to be used for comparing with the changes of measurement quantities (SS-RSRP, CSI-RSRP, SS-RSRQ, CSI-RSRQ, SS-SINR, CSI-SINR) of the current and previous measurements for serving cells, respectively.

TABLE 17

A MODIFIED RRC INFORMATION ELEMENT
MEASCONFIG OF TS 38.331

```
-- ASN1START
-- TAG-MEASCONFIG-START
MeasConfig ::=                    SEQUENCE {
    measObjectToRemoveList        MeasObjectToRemoveList
OPTIONAL, -- Need N
    ...
    s-MeasureConfig               CHOICE {
        ssb-RSRP                  RSRP-Range,
        csi-RSRP                  RSRP-Range
    }
    sDelta-MeasureConfig          CHOICE {
        deltaSsb-RSRP             DeltaRSRP-Range,
        deltaCsi-RSRP             DeltaRSRP-Range,
        deltaSsb-RSRQ             DeltaRSRQ-Range,
        deltaCsi-RSRQ             DeltaRSRQ-Range,
        deltaSsb-SINR             DeltaSINR-Range,
        deltaCsi-SINR             DeltaSINR-Range
    }
...
```

A modified procedure of performing measurements in Clause 5.5.3.1 of TS 38.331 for a sub-embodiment is shown in TABLE 18. As shown in TABLE 18, the new event configuration parameter, SS-EventTriggered, is added as an additional condition in Step 2. As shown in Step 4 of TABLE 18, if sDelta-MeasureConfig is set to deltaSsb-RSRP (or deltaSsb-RSRQ, deltaSsb-SINR) and the difference between the previous and current NR SpCell RSRPs (or RSRQs, SINRs) based on synchronization signals (SS)/Physical Broadcast Channel (PBCH) block, after layer 3 filtering, is lower than deltaSsb-RSRP (or deltaSsb-RSRQ, deltaSsb-SINR), or if sDelta-MeasureConfig is set to deltaCsi-RSRP (or deltaCsi-RSRQ, deltaCsi-SINR) and the difference between the previous and current NR SpCell RSRPs (or RSRQs, SINRs) based on CSI-RS, after layer 3 filtering, is lower than deltaCsi-RSRP (or deltaCsi-RSRQ, deltaCsi-SINR), the next steps can be proceeded as described in TABLE 18. In Steps 6 and 7 of TABLE 18, for each case of rsType set to csi-rs/ssb, the procedure to derive the change of the measurement results (e.g., change of interference levels) is described when the MeasTriggerQuantitySS (defined in TABLE 16) is set to deltaRsrp, deltaRsrq, or deltaSinr.

TABLE 18

A MODIFIED PROCEDURE OF PERFORMING
MEASUREMENTS IN CLAUSE 5.5.3.1 OF TS 38.331

```
1>for each measId included in the measIdList within VarMeasConfig:
    2>if the reportType for the associated reportConfig is periodical,
       eventTriggered, condTriggerConfig, or SS-Event Triggered:
        ...
        4>if sDelta-MeasureConfig is not configured, or
        4>if sDelta-MeasureConfig is set to deltaSsb-RSRP (or
           deltaSsb-RSRQ, deltaSsb-SINR) and the difference between
           the previous and current NR SpCell RSRPs (or RSRQs, SINRs)
           based on SS/PBCH block, after layer 3filtering, is lower than
           deltaSsb-RSRP (or deltaSsb-RSRQ, deltaSsb-SINR), or
        4>if sDelta-MeasureConfig is set to deltaCsi-RSRP (or deltaCsi-
           RSRQ, deltaCsi-SINR) and the difference between the
           previous and current NR SpCell RSRPs (or RSRQs, SINRs)
           based on CSI-RS, after layer 3 filtering, is
           lower than deltaCsi-RSRP (or deltaCsi-RSRQ, deltaCsi-SINR):
            ...
            5>if the measObject is associated to NR and the rsType is
               set to csi-rs:
                ...
                6>if the trigger quantity (i.e., MeasTriggerQuantitySS) is set
                   to deltaRsrp, deltaRsrq, or deltaSinr:
```

TABLE 18-continued

A MODIFIED PROCEDURE OF PERFORMING
MEASUREMENTS IN CLAUSE 5.5.3.1 OF TS 38.331

```
                    7>derive change values of the cell measurement results
                       based on CSI-RS using the previous and current
                       measurement results
            5>if the measObject is associated to NR and the rsType is set
               to ssb:
                ...
                6>if the trigger quantity (i.e., MeasTriggerQuantitySS) is set
                   to deltaRsrp, deltaRsrq, or deltaSinr:
                    7>derive change values of the cell measurement results
                       based on SS/PBCH block using the previous and current
                       measurement results
```

Other procedures in Clauses 5.5.4 and 5.5.5 of TS 38.331 can be modified in an appropriate manner that is according to the modifications shown in TABLE 17 and 18. Examples are shown in TABLES 3 and 4.

Certain sub-embodiments are illustrated in TABLES 19, 20, and 21. This realization is an example presented for illustration only and should not be interpreted as normative operations. Newly added/modified parameters or descriptions as compared to the original ones in TS 38.331 are highlighted in TABLES 19, 20, and 21, respectively. In another realization, part of the parameters or descriptions can be removed and/or new parameters or descriptions can be added on the top of this realization in an appropriate manner.

A modified RRC Information Element ReportConfigNR of TS 38.331 for a sub-embodiment is shown in TABLE 19. As described in the parameter MeasTriggerQuantity, deltaRsrp, deltaRsrq, and/or deltaSinr are added and the trigger quantity parameters to be used for comparing with the changes of the current and previous RSRP, RSRQ, and/or SINR measurements for serving and/or neighboring cell(s), respectively. Since the parameters indicate the change of the measurement quantities of the current and previous measurements, ranges for the parameters can be newly defined. In one example, DeltaRSRP-Range, DeltaRSRQ-Range, and DeltaSINR-Range can be specified as Integer (0, . . . , 31), and the actual value can be mapped to, e.g., (IE value−16) dB. In the parameterMeasReportQuantity, as shown in TABLE 19, the changes of the current and previous RSRP, RSRQ, and/or SINR measurements (in addition to RSRP, RSRQ, and/or SINR measurement quantity itself) for serving and/or neighboring cells can be included in measurement reporting contents. As described in the parameter eventA8 of TABLE 19, two threshold values are defined to compare with the changes of the interference levels and serving cell signal qualities at the current and previous measurements, respectively.

TABLE 19

A MODIFIED RRC INFORMATION ELEMENT
REPORTCONFIGNR OF TS
38.331

```
-- ASN1START
-- TAG-REPORTCONFIGNR-START
ReportConfigNR ::=             SEQUENCE {
    reportType                 CHOICE {
        periodical             PeriodicalReportConfig,
        eventTriggered         EventTriggerConfig,
    ...,
    }
}
...
```

TABLE 19-continued

A MODIFIED RRC INFORMATION ELEMENT REPORTCONFIGNR OF TS 38.331

```
EventTriggerConfig::=        SEQUENCE {
  eventId                    CHOICE {
    ...
    eventA8                  SEQUENCE {
      a8-Threshold1            MeasTriggerQuantity,
      a8-Threshold2            MeasTriggerQuantity,
      reportOnLeave            BOOLEAN,
      hysteresisN              Hysteresis,
      hysteresisP              Hysteresis,
      timeToTrigger            TimeToTrigger,
      useWhiteCellList         BOOLEAN
    },
  },
...
MeasTriggerQuantity ::=      CHOICE {
  rsrp                         RSRP-Range,
  rsrq                         RSRQ-Range,
  sinr                         SINR-Range,
  deltaRsrp                    DeltaRSRP-Range,
  deltaRsrq                    DeltaRSRQ-Range,
  deltaSinr                    DeltaSINR-Range
}
...
MeasReportQuantity ::=       SEQUENCE {
  rsrp                         BOOLEAN,
  rsrq                         BOOLEAN,
  sinr                         BOOLEAN,
  DeltaRsrp                    BOOLEAN,
  DeltaRsrq                    BOOLEAN,
  DeltaSinr                    BOOLEAN
}
```

In one realization of a sub-embodiment, parameter sDelta-MeasureConfig can be defined as illustrated in TABLE 20 (same as TABLE 17). deltaSsb-RSRP, deltaCsi-RSRP, deltaSsb-RSRQ, deltaCsi-RSRQ, deltaSsb-SINR, and deltaCsi-SINR are the trigger quantities to be used for comparing with the changes of measurement quantities (SS-RSRP, CSI-RSRP, SS-RSRQ, CSI-RSRQ, SS-SINR, CSI-SINR) of the current and previous measurements for serving cells, respectively.

TABLE 20

A MODIFIED RRC INFORMATION ELEMENT *MEASCONFIG* OF TS 38.331

```
-- ASN1START
-- TAG-MEASCONFIG-START
MeasConfig ::=                   SEQUENCE {
  measObjectToRemoveList                              MeasObjectToRemoveList
    OPTIONAL, -- Need N
  ...
  s-MeasureConfig                CHOICE {
    ssb-RSRP                       RSRP-Range,
    csi-RSRP                       RSRP-Range
  }
  sDelta-MeasureConfig           CHOICE {
    deltaSsb-RSRP                  DeltaRSRP-Range,
    deltaCsi-RSRP                  DeltaRSRP-Range,
    deltaSsb-RSRQ                  DeltaRSRQ-Range,
    deltaCsi-RSRQ                  DeltaRSRQ-Range,
    deltaSsb-SINR                  DeltaSINR-Range,
    deltaCsi-SINR                  DeltaSINR-Range
  }
  ...
}
```

A modified procedure of performing measurements in Clause 5.5.3.1 of TS 38.331 for a sub-embodiment is shown in TABLE 18. As shown in Step 4 of TABLE 21, if sDelta-MeasureConfig is set to deltaSsb-RSRP (or deltaSsb-RSRQ, deltaSsb-SINR) and the difference between the previous and current NR SpCell RSRPs (or RSRQs, SINRs) based on SS/PBCH block, after layer 3 filtering, is lower than deltaSsb-RSRP (or deltaSsb-RSRQ, deltaSsb-SINR), or if sDelta-MeasureConfig is set to deltaCsi-RSRP (or deltaCsi-RSRQ, deltaCsi-SINR) and the difference between the previous and current NR SpCell RSRPs (or RSRQs, SINRs) based on CSI-RS, after layer 3 filtering, is lower than deltaCsi-RSRP (or deltaCsi-RSRQ, deltaCsi-SINR), the next steps can be proceeded as described in TABLE 21. In Steps 6 and 7 of TABLE 21, for each case of rsType set to csi-rs/ssb, the procedure to derive the change of the measurement results (e.g., change of interference levels) is described when the MeasTriggerQuantity (defined in TABLE 19) is set to deltaRsrp, deltaRsrq, or deltaSinr.

TABLE 21

A MODIFIED PROCEDURE OF PERFORMING MEASUREMENTS IN
CLAUSE 5.5.3.1 OF TS 38.331

2> if the *reportType* for the associated *reportConfig* is *periodical*, *eventTriggered* or
   *condTriggerConfig*:
. . .
    4> if *sDelta-MeasureConfig* is not configured, or
    4>if *sDelta-MeasureConfig* is set to *deltaSsb-RSRP* (or *deltaSsb-RSRQ*,
       *deltaSsb-SINR*) and the difference between the previous and current NR
       SpCell RSRPs (or RSRQs, SINRs) based on SS/PBCH block, after layer 3
       filtering, is lower than *deltaSsb-RSRP* (or *deltaSsb-RSRQ*, *deltaSsb-SINR*), or
    4>if *sDelta-MeasureConfig* is set to *deltaCsi-RSRP* (or *deltaCsi-RSRQ*,
       *deltaCsi-SINR*) and the difference between the previous and current NR
       SpCell RSRPs (or RSRQs, SINRs) based on CSI-RS, after layer 3 filtering, is
       lower than *deltaCsi-RSRP* (or *deltaCsi-RSRQ*, *deltaCsi-SINR*) :
...
       5> if the *measObject* is associated to NR and the *rsType* is set to *csi-rs*:
         . . .
           6> if the trigger quantity (i.e., *MeasTriggerQuantity*) is set to *deltaRsrp*,
              *deltaRsrq*, or *deltaSinr*:
              7> derive change values of the cell measurement results based on CSI-
                 RS using the previous and current measurement results
       5> if the *measObject* is associated to NR and the *rsType* is set to *ssb*:
         . . .
           6> if the trigger quantity (i.e., *MeasTriggerQuantity*) is set to *deltaRsrp*,
              *deltaRsrq*, or *deltaSinr*:
              7> derive change values of the cell measurement results based on
                 SS/PBCH block using the previous and current measurement results Definitions of Delta RSRP/RSRQ/SINR: Please see TABLES 7, 8, 9, 10, 11, and 12.

New Event Description in Measurement Report Triggering:

In certain embodiments, new report triggering events can be defined as illustrated in TABLES 22, 23, and 24. TABLE 22 shows an example of new event description for the case that UE 116 enters or leaves the triggering condition with respect to the criteria, whether the absolute change of interference levels becomes larger than a first threshold while the absolute change of serving sell signal qualities is smaller than a second threshold, or not. Since TABLE 22 considers the absolute change of interference levels while the absolute change of serving cell signal qualities is sufficiently small, it can trigger measurement reporting for both the cases that interference increases and decreases by a certain amount of change while the absolute change of serving cell signal qualities is sufficiently small. TABLES 23 and 24 show examples of new event descriptions for both cases, respectively, while considering each individual case as a separate event for measurement report triggering.

TABLE 22

AN EXAMPLE OF NEW EVENT DESCRIPTION IN MEASUREMENT REPORT
TRIGGERING OF CLAUSE 5.5.4 OF TS 38.331

(the absolute change of interference becomes higher than threshold1 while the absolute
change of serving sell signal qualities is smaller than threshold2)
The UE shall:
    1>consider the entering condition for this event to be satisfied when both condition S2-1
        and condition S2-2, as specified below, are fulfilled;
    1>consider the leaving condition for this event to be satisfied when condition S2-3 or
        condition S2-4, i.e. at least one of the two, as specified below, is fulfilled;
    1>use the SpCell for *Mp*.
    NOTE:   The parameters of the reference signal(s) of the cell(s) that triggers the event
                are indicated in the *measObjectNR* associated to the event which may be
                different from the *measObjectNR* of the NR SpCell.
Inequality S2-1 (Entering condition 1)
|DeltaMn| +Ofn+Ocn − Hysn> Thresh1
Inequality S2-2 (Entering condition 2)
|DeltaMp| +Ofp+Ocp + Hysp < Thresh2
Inequality S2-3 (Leaving condition 1)
|DeltaMn| + Ofn+Ocn + Hysn < Thresh1
Inequality S2-4 (Leaving condition 2)
|DeltaMp| +Ofp+Ocp − Hysp > Thresh2
The variables in the formula are defined as follows:
    DeltaMn is the change of the measurement results at the current and previous
        measurements of the neighbouring cell, not taking into account any offsets.
    DeltaMp is the change of the measurement results at the current and previous
        measurements of the NR SpCell, not taking into account any offsets.
    Ofn is the measurement object specific offset of the neighbour cell (i.e. *offsetMO* as defined
        within *measObjectNR* corresponding to the neighbour cell).
    Ocn is the measurement object specific offset of the neighbour cell (i.e.
        *cellIndividualOffset* as defined within *measObjectNR* corresponding to the neighbour
        cell), and set to zero if not configured for the neighbour cell.

TABLE 22-continued

AN EXAMPLE OF NEW EVENT DESCRIPTION IN MEASUREMENT REPORT TRIGGERING OF CLAUSE 5.5.4 OF TS 38.331

*Ofp* is the measurement object specific offset of the SpCell (i.e. *offsetMO* as defined within *measObjectNR* corresponding to the SpCell).
*Ocp* is the cell specific offset of the SpCell (i.e. *cellIndividualOffset* as defined within *measObjectNR* corresponding to the SpCell), and is set to zero if not configured for the SpCell.
*Hysn* is the hysteresis parameter for the neighbour cell (i.e. *hysteresisN* as defined within *reportConfigNR* for this event).
*Hysp* is the hysteresis parameter for the SpCell (i.e. *hysteresisP* as defined within *reportConfigNR* for this event).
*Thresh1* is the threshold parameter for this event (i.e. s2-*Threshold1* as defined within *reportConfigNR* for this event).
*Thresh2* is the threshold parameter for this event (i.e. s2-*Threshold2* as defined within *reportConfigNR* for this event).
*All parameters* are expressed in dB.

TABLES 23

AN EXAMPLE OF NEW EVENT DESCRIPTION IN MEASUREMENT REPORT TRIGGERING OF CLAUSE 5.5.4 OF TS 38.331

(interference increases by certain amount of change (threshold1) while the absolute change of serving sell signal qualities is smaller than threshold2)
The UE shall:
  1>consider the entering condition for this event to be satisfied when both condition S2-1 and condition S2-2, as specified below, are fulfilled;
  1>consider the leaving condition for this event to be satisfied when condition S2-3 or condition S2-4, i.e. at least one of the two, as specified below, is fulfilled;
  1>use the SpCell for *Mp*.
  NOTE:  The parameters of the reference signal(s) of the cell(s) that triggers the event are indicated in the *measObjectNR* associated to the event which may be different from the *measObjectNR* of the NR SpCell.
Inequality S2-1 (Entering condition 1)
$DeltaMn + Ofn + Ocn - Hysn > Thresh1$
Inequality S2-2 (Entering condition 2)
$|DeltaMp| + Ofp + Ocp + Hysp < Thresh2$
Inequality S2-3 (Leaving condition 1)
$DeltaMn + Ofn + Ocn + Hysn < Thresh1$
Inequality S2-4 (Leaving condition 2)
$|DeltaMp| + Ofp + Ocp - Hysp > Thresh2$
The variables in the formula are defined as follows:
*DeltaMn* is the change of the measurement results at the current and previous measurements of the neighbouring cell, not taking into account any offsets.
*DeltaMp* is the change of the measurement results at the current and previous measurements of the NR SpCell, not taking into account any offsets.
*Ofn* is the measurement object specific offset of the neighbour cell (i.e. *offsetMO* as defined within *measObjectNR* corresponding to the neighbour cell).
*Ocn* is the measurement object specific offset of the neighbour cell (i.e. *cellIndividualOffset* as defined within *measObjectNR* corresponding to the neighbour cell), and set to zero if not configured for the neighbour cell.
*Ofp* is the measurement object specific offset of the SpCell (i.e. *offsetMO* as defined within *measObjectNR* corresponding to the SpCell).
*Ocp* is the cell specific offset of the SpCell (i.e. *cellIndividualOffset* as defined within *measObjectNR* corresponding to the SpCell), and is set to zero if not configured for the SpCell.
*Hysn* is the hysteresis parameter for the neighbour cell (i.e. *hysteresisN* as defined within *reportConfigNR* for this event).
*Hysp* is the hysteresis parameter for the SpCell (i.e. *hysteresisP* as defined within *reportConfigNR* for this event).
*Thresh1* is the threshold parameter for this event (i.e. s2-*Threshold1* as defined within *reportConfigNR* for this event).
*Thresh2* is the threshold parameter for this event (i.e. s2-*Threshold2* as defined within *reportConfigNR* for this event).
*All parameters* are expressed in dB.

TABLE 24

AN EXAMPLE OF NEW EVENT DESCRIPTION IN MEASUREMENT REPORT TRIGGERING OF CLAUSE 5.5.4 OF TS 38.331

(interference decreases by certain amount of change (threshold1) while the absolute change of serving sell signal qualities is smaller than threshold2)

TABLE 24-continued

AN EXAMPLE OF NEW EVENT DESCRIPTION IN MEASUREMENT REPORT
TRIGGERING OF CLAUSE 5.5.4 OF TS 38.331

The UE shall:
  1>consider the entering condition for this event to be satisfied when both condition S2-1
    and condition S2-2, as specified below, are fulfilled;
  1>consider the leaving condition for this event to be satisfied when condition S2-3 or
    condition S2-4, i.e. at least one of the two, as specified below, is fulfilled;
  1>use the SpCell for *Mp*.
  NOTE:   The parameters of the reference signal(s) of the cell(s) that triggers the event
            are indicated in the *measObjectNR* associated to the event which may be
            different from the *measObjectNR* of the NR SpCell.
Inequality S2-1 (Entering condition 1)
DeltaMn+Ofn+Ocn − Hysn < Thresh1
Inequality S2-2 (Entering condition 2)
|DeltaMp| +Ofp+Ocp + Hysp < Thresh2
Inequality S2-3 (Leaving condition 1)
DeltaMn+Ofn+Ocn +Hysn > Thresh1
Inequality S2-4 (Leaving condition 2)
|DeltaMp| +Ofp+Ocp − Hysp > Thresh2
The variables in the formula are defined as follows:
  DeltaMn is the change of the measurement results at the current and previous
    measurements of the neighbouring cell, not taking into account any offsets.
  DeltaMp is the change of the measurement results at the current and previous
    measurements of the NR SpCell, not taking into account any offsets.
  Ofn is the measurement object specific offset of the neighbour cell (i.e. *offsetMO* as defined
    within *measObjectNR* corresponding to the neighbour cell).
  Ocn is the measurement object specific offset of the neighbour cell (i.e.
    *cellIndividualOffset* as defined within *measObjectNR* corresponding to the neighbour
    cell), and set to zero if not configured for the neighbour cell.
  Ofp is the measurement object specific offset of the SpCell (i.e. *offsetMO* as defined within
    *measObjectNR* corresponding to the SpCell).
  Ocp is the cell specific offset of the SpCell (i.e. *cellIndividualOffset* as defined within
    *measObjectNR* corresponding to the SpCell), and is set to zero if not configured for the
    SpCell.
  Hysn is the hysteresis parameter for the neighbour cell (i.e. *hysteresisN* as defined within
    *reportConfigNR* for this event).
  Hysp is the hysteresis parameter for the SpCell (i.e. *hysteresisP* as defined within
    *reportConfigNR* for this event).
  Thresh1 is the threshold parameter for this event (i.e. s2-*Threshold1* as defined within
    *reportConfigNR* for this event).
  Thresh2 is the threshold parameter for this event (i.e. s2-*Threshold2* as defined within
    *reportConfigNR* for this event).
  *All parameters* are expressed in dB.

Figure 11:
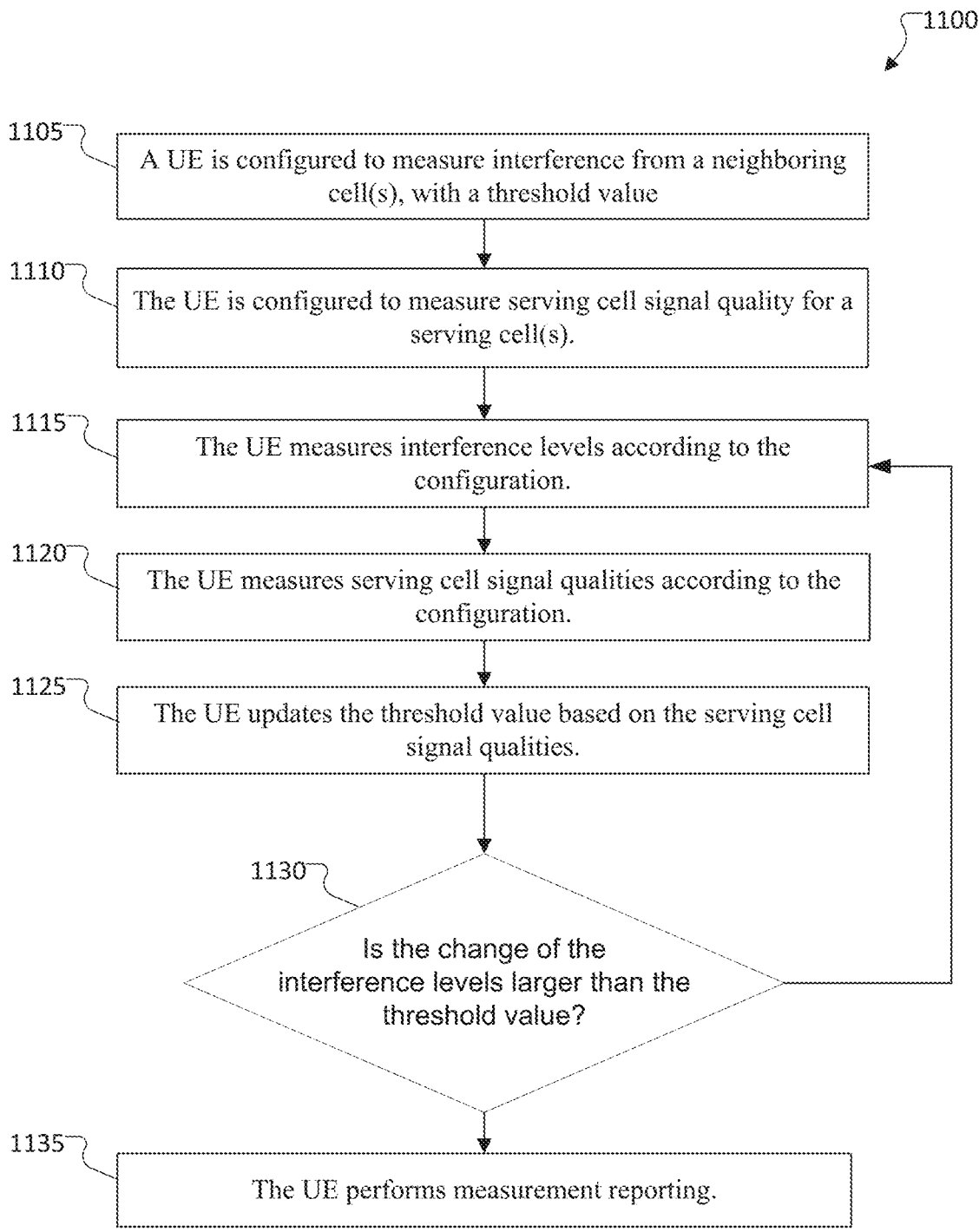
FIG. 11 illustrates a process for measurement and reporting operation, wherein reporting is triggered when the interference level becomes larger than an adaptive threshold, which is updated based on serving cell signal quality according to embodiments of the present disclosure.

FIG. 11 illustrates a process for measurement and reporting operation, wherein reporting is triggered when the interference level becomes larger than an adaptive threshold, which is updated based on serving cell signal quality according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1100 depicted in the example depicted is implemented by a transmitter and processor chains in, for example, a UE. The process 1100 can be accomplished by, for example, UE 114, 115, and 116 in network 600.

At operation 1105, UE 116 is configured to measure interference from a neighboring cell(s), with a threshold value. At operation 1110, UE 116 is configured to measure serving cell signal qualities for a serving cell(s). In one example, as described in Information Element MeasObjectNR in TS 38.331, information including SSB frequency, SSB subcarrier spacing, CSI-RS frequency, and/or physical cell ID can be configured for UE 116 to measure interference and serving cell signal qualities corresponding to the configuration. In one example, as described in Information Element ReportConfigNR in TS 38.331, information including report type, report interval, report amount, trigger quantity, and/or report quantity can be configured for UE 116 to report measurement information according to the configuration. In another example, a configuration for measurements and reporting can be signaled/updated via L1 or L2 DL control (i.e., PDCCH or MAC CE). At operation 1115, UE 116 measures interference levels according to the configuration(s). At operation 1120, UE 116 measures serving cell signal qualities according to the configuration(s). At operation 1125, UE 116 updates the threshold value, which can be updated as a function of the serving cell signal qualities. In one example, UE 116 can update the threshold value as $$X_{TH}^{current} = c - M_{serv}^{current} \text{ [dB]}, \quad (4)$$

where $X_{TH}^{current}$, c, and $M_{serv}^{current}$, are the updated threshold value to be used for report triggering at the current or the next measurement (right after it is updated), a constant value which can be configured or fixed, and the serving cell signal quality at the current measurement. In another example, UE 116 can update the threshold value using the change of the serving cell signal qualities of the current and previous measurements. For example, the change of the serving cell signal qualities can be:

$$\Delta M_{serv} = M_{serv}^{current} - M_{serv}^{previous} \text{ [dB]}, \quad (5)$$

where $M_{serv}^{current}$, $M_{serv}^{previous}$ are the RSRPs, RSRQs, or SINRs at the current and previous measurements for the serving cell(s), respectively. Here $M_{serv}^{current}$, $M_{serv}^{previous}$ can be the layer-3 filtered outputs of the current and previous measurements, as described in Clause 5.5.3.2 of TS 38.331. In this example, the threshold value can be updated as:

$$X_{TH}^{current} = X_{TH}^{previous} - f(\Delta M_{serv})[dB], \quad (6)$$

where $X_{TH}^{current}$, $X_{TH}^{previous}$ are the threshold values used for reporting triggering at the current and previous measurements, respectively, and $f(\cdot)$ is a function to model any relationship of the threshold and the change of serving cell signal qualities. In one example, the function can be set to $f(x)=x$, which implies $$X_{TH}^{current} = X_{TH}^{previous} - \Delta M_{serv}[dB] \quad (7)$$

In another example, the function can be a function of location of UE 116 and/or the change of serving cell qualities. At operation 1130, UE 116 checks whether the change in the interference level is larger than (or larger than or equal to) the updated threshold value or not. Here, the initial threshold value can be configured as described in Information Element ReportConfigNR in TS. 38.331, but once it is initialized, the threshold value can be adaptively updated as described at operation 1125. At operation 1135, UE 116 performs measurement reporting when the change in the interference level is larger than the updated threshold (or larger than or equal to the updated threshold) in operation 1130. In one example, UE 116 can report the current interference measurement, the change of the interference levels of the current and previous measurements, the current serving cell signal quality, the change of the serving cell signal qualities of the current and previous measurements, updated threshold value, and/or other measurement quantities including RSRQ, SINR, and so on. If the change in the interference level is not larger than the updated threshold (or less than or the updated threshold) in operation 1130, UE 116 can continue to perform measurement according to the configuration as operations 1115/1120, or exit to perform measurement.

Figure 12A:
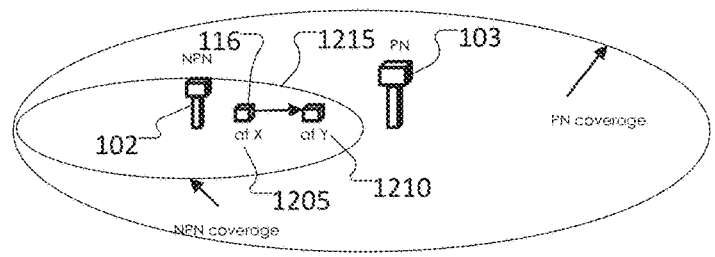
FIGS. 12A, 12B, and 12C illustrate a user terminal movement and associated measurement results according to embodiments of the present disclosure.
Figure 12B:
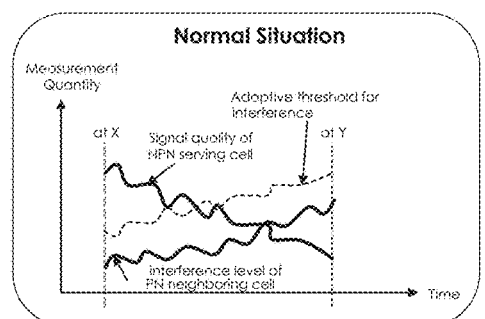
Figure 12C:
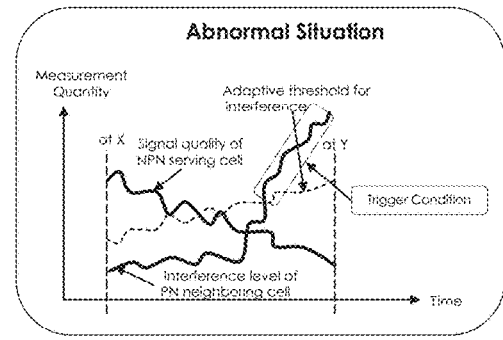

FIGS. 12A, 12B, and 12C illustrate a user terminal movement and associated measurement results according to embodiments of the present disclosure. FIG. 12A illustrates a UE movement according to embodiments of the present disclosure. FIG. 12B illustrates measurement results in a normal situation according to embodiments of the present disclosure. FIG. 12C illustrates measurement results in an abnormal situation according to embodiments of the present disclosure. The embodiments of the user terminal movement and associated measurement results shown in FIGS. 12A, 12B, and 12C are for illustration only. Other embodiments could be used without departing from the scope of the present disclosure.

FIGS. 12A-12C illustrate a visual example of how report-triggering condition of an embodiment can work. In this example, as shown in FIG. 12A, UE 116, which is associated with NPN BS, gNB 102, is moving from point X 1205 to point Y 1210. As UE 116 moves away from its associated gNB 102 toward cell-edge location Y 1205, the gNB 102 serving cell signal power becomes reduced and the interference power of PN neighboring cell, such as gNB 103, becomes increased. To properly account for this effect, the threshold for "interference monitoring" operation is adaptively updated and computed based on the serving cell signal quality or the change of serving cell signal qualities of the current and previous measurements. In normal situation, as shown in FIG. 12B, as UE 116 moves toward cell edge 1215 of the gNB 102 coverage, the interference power increases but does not exceed the updated adaptive threshold value, if it is properly updated by using serving cell signal qualities. However, in an abnormal situation, which happens usually when the PN neighboring cell uses excessive transmit power, as shown in FIG. 12C, the interference can drastically increase so the value will exceed the updated threshold value. This adaptive threshold value update mechanism can help gNB 102 intelligently identify actual interference circumstance when UE 116 is in mobility scenarios.

Figure 13:
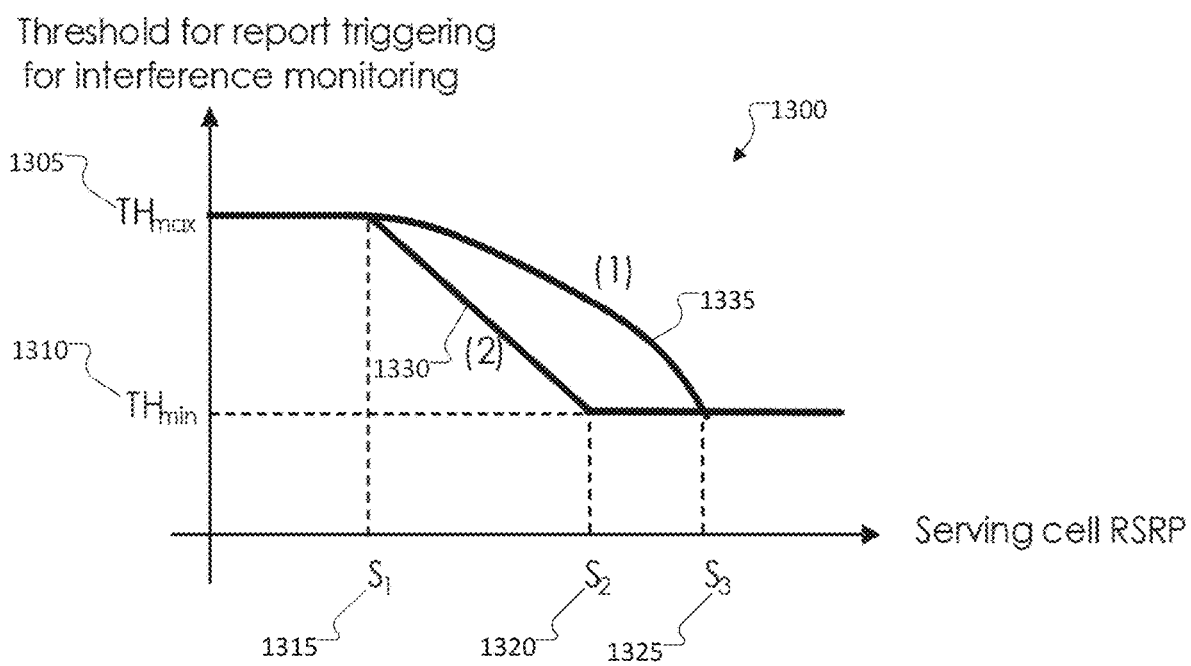
FIG. 13 illustrates a threshold value for interference monitoring as a function of serving cell reference signal received power according to embodiments of the present disclosure.

FIG. 13 illustrates a threshold value for interference monitoring as a function of serving cell RSRP according to embodiments of the present disclosure. The embodiment of the threshold value function 1300 shown in FIG. 13 is for illustration only. Other embodiments could be used without departing from the scope of the present disclosure.

The function 1300 can be realized in various forms. In certain embodiments, UE 116 can be configured with a maximum threshold value, $TH_{max}$ 1305, and minimum threshold value, $TH_{min}$ 1310, and corresponding serving cell RSRPs, $S_1$ 1315, $S_2$ 1320, and $S_3$ 1325. In this example, the UE 116 can set the threshold value corresponding to the current serving cell RSRP for interference monitoring, by using the linear relationship 1330 of $TH_{max}$ 1305, $TH_{min}$ 1310, and $S_1$ 1315 and $S_2$ 1320. In another example, a concave function 1335 of serving cell RSRP can be used to compute threshold value for interference monitoring.

An Embodiment with Defining New Event Category

Certain embodiments can be illustrated in TABLES 25, 26, 3, and 4. This realization is an example presented for illustration only and should not be interpreted as normative operations. Newly added/modified parameters or descriptions compared to the original ones in TS 38.331 are highlighted in TABLES 25, 26, 3, and 4, respectively. In certain embodiments, part of the parameters or descriptions can be removed and/or new parameters or descriptions can be added on the top of this realization in an appropriate manner.

A modified RRC Information Element ReportConfigNR of TS 38.331 for an embodiment is shown in TABLE 25. As shown in TABLE 25, SS-EventTriggerConfig, a parameter for a report-triggering event, is defined and it contains event ID, RS type, report interval, report amount, and so on to specify configurations for event-triggering measurement reporting. As described in the parameter MeasTriggerQuantitySS, adaptiveRsrp, adaptiveRsrq, and adaptiveSinr are the trigger quantity parameters to indicate that the trigger quantity will be updated by using the changes of the current and previous RSRP, RSRQ, and SINR measurements for serving cells, respectively. In the parameter MeasReportQuantitySS, as shown in TABLE 25, the updated threshold value and the changes of the current and previous RSRP, RSRQ, and/or SINR measurements (in addition to RSRP, RSRQ, and/or SINR measurement quantity itself) for serving and/or neighboring cells can be included in measurement reporting contents.

TABLE 25

A MODIFIED RRC INFORMATION ELEMENT *REPORTCONFIGNR* OF TS 38.331

```
ReportConfigNR ::=          SEQUENCE {
  reportType                CHOICE {
    ...
    ss-EventTriggered       SS-EventTriggerConfig,
  }
}
...
SS-EventTriggerConfig ::=    SEQUENCE {
  eventId                    CHOICE {
    eventS3                  SEQUENCE {
      s3-Threshold             MeasTriggerQuantitySS,
      reportOnLeave            BOOLEAN,
      hysteresis               Hysteresis,
      timeToTrigger            TimeToTrigger,
      useWhiteCellList         BOOLEAN
    },
  ...
  },
  rsType                     NR-RS-Type,
  reportInterval             ReportInterval,
  reportAmount               ENUMERATED {r1, r2, r4, r8, r16, r32, r64, infinity},
  reportQuantityCell         MeasReportQuantitySS,
  maxReportCells             INTEGER (1..maxCellReport),
  ...
}
...
MeasTriggerQuantitySS ::=    CHOICE {
  adaptiveRsrp               RSRP-Range,
  adaptiveRsrq               RSRQ-Range,
  adaptiveSinr               SINR-Range
}
...
MeasReportQuantitySS ::=     SEQUENCE {
  rsrp            BOOLEAN,
  rsrq            BOOLEAN,
  sinr            BOOLEAN,
  DeltaRsrp          BOOLEAN,
  DeltaRsrq          BOOLEAN,
  DeltaSinr          BOOLEAN,
  updatedThreshold   BOOLEAN
}
```

A modified procedure of performing measurements in Clause 5.5.3.1 of TS 38.331 for an embodiment is shown in TABLE 26. As shown in TABLE 26, the new event configuration parameter, SS-Event Triggered, is added as an additional condition in Step 2. As described in Step 6 of TABLE 26, if the trigger quantity (i.e., MeasTriggerQuantitySS) is set to adaptiveRsrp, adaptiveRsrq, or adaptiveSinr, the following steps are performed: update the current trigger quantity by subtracting the change of the current and previous NR SpCell measurement quantities from the previous trigger quantity, and derive cell measurement results (for neighbouring cells) for the trigger quantity, which are described in Step 7.

TABLE 26

A MODIFIED PROCEDURE OF PERFORMING MEASUREMENTS IN CLAUSE 5.5.3.1 OF TS 38.331

1> for each *measId* included in the *measIdList* within *VarMeasConfig*:
  2> if the reportType for the associated *reportConfig* is *periodical*, *eventTriggered*, *condTriggerConfig*, or *SS-Event Triggered*:
    ...
    5> if the *measObject* is associated to NR and the *rsType* is set to *csi-rs*:
      ...
      6> if the trigger quantity (i.e., *MeasTriggerQuantitySS*) is set to *adaptiveRsrp*, *adaptiveRsrq*, or *adaptiveSinr*:
        7> update the current trigger quantity by subtracting the change of the current and previous NR SpCell measurement quantities (i.e., RSRPs, RSRQs, or SINRs) from the previous trigger quantity
        7> derive cell measurement results based on CSI-RS for the trigger quantity
      ...
    5> if the *measObject* is associated to NR and the *rsType* is set to *ssb*:
      ...
      6> if the trigger quantity (i.e., *MeasTriggerQuantitySS*) is set to TABLE 26-continued

A MODIFIED PROCEDURE OF PERFORMING MEASUREMENTS IN
CLAUSE 5.5.3.1 OF TS 38.331

*adaptiveRsrp, adaptiveRsrq,* or *adaptiveSinr*:
   7> update the current trigger quantity by subtracting the change of the
      current and previous NR SpCell measurement quantities (i.e.,
      RSRPs, RSRQs, or SINRs) from the previous trigger quantity
   7>derive cell measurement results based on SS/PBCH block for the
      trigger quantity
   ...

Other procedures in Clauses 5.5.4 and 5.5.5 of TS 38.331 can be modified in an appropriate manner that is according to the modifications shown in TABLES 25 and 26. Examples are shown in TABLES 3 and 4.

Embodiment Using the Existing Event Category

Certain embodiments can be illustrated in TABLES 27 and 28. This realization is an example of an embodiment so should not be interpreted as normative operations. Newly added/modified parameters or descriptions compared to the original ones in TS 38.331 are highlighted in TABLES 27 and 28, respectively. In another realization, part of the parameters or descriptions can be removed and/or new parameters or descriptions can be added on the top of this realization in an appropriate manner.

A modified RRC Information Element ReportConfigNR of TS 38.331 for an embodiment is shown in TABLE 27. As described in the parameter MeasTriggerQuantity, adaptiveRsrp, adaptiveRsrq, and adaptiveSinr are the trigger quantity parameters to indicate that the trigger quantity will be updated by using the changes of the current and previous RSRP, RSRQ, and SINR measurements for serving cells, respectively. In the parameter MeasReportQuantity, as shown in TABLE 27, the updated threshold value and the changes of the current and previous RSRP, RSRQ, and/or SINR measurements (in addition to RSRP, RSRQ, and/or SINR measurement quantity itself) for serving and/or neighboring cells can be included in measurement reporting contents.

TABLE 27

A MODIFIED RRC INFORMATION ELEMENT *REPORTCONFIGNR* OF TS
38.331

```
-- ASN1START
-- TAG-REPORTCONFIGNR-START
ReportConfigNR ::=      SEQUENCE {
    reportType          CHOICE {
        periodical          PeriodicalReportConfig,
        eventTriggered      EventTriggerConfig,
        ...,
    }
}
...
EventTriggerConfig::=   SEQUENCE {
    eventId             CHOICE {
        ...
        eventA9             SEQUENCE {
            a9-Threshold        MeasTriggerQuantity,
            reportOnLeave       BOOLEAN,
            hysteresis          Hysteresis,
            timeToTrigger       TimeToTrigger,
            useWhiteCellList    BOOLEAN
        },
    },
...
MeasTriggerQuantity ::=  CHOICE {
    rsrp                RSRP-Range,
    rsrq                RSRQ-Range,
    sinr                SINR-Range,
    adaptiveRsrp        RSRP-Range,
    adaptiveRsrq        RSRQ-Range,
    adaptiveSinr        SINR-Range
}
...
MeasReportQuantity ::=  SEQUENCE {
    rsrp                BOOLEAN,
    rsrq                BOOLEAN,
    sinr                BOOLEAN,
    DeltaRsrp           BOOLEAN,
    DeltaRsrq           BOOLEAN,
    DeltaSinr           BOOLEAN,
    updatedThreshold    BOOLEAN
}
```

A modified procedure of performing measurements in Clause 5.5.3.1 of TS 38.331 for an embodiment is shown in TABLE 28. As described in Step 6 of TABLE 28, if the trigger quantity (i.e., MeasTriggerQuantity) is set to adaptiveRsrp, adaptiveRsrq, or adaptiveSinr, the following steps are performed: update the current trigger quantity by subtracting the change of the current and previous NR SpCell measurement quantities from the previous trigger quantity, and derive cell measurement results (for neighbouring cells) for the trigger quantity, which are described in Step 7.

TABLE 28

A MODIFIED PROCEDURE OF PERFORMING MEASUREMENTS IN CLAUSE 5.5.3.1 OF TS 38.331

2> if the *reportType* for the associated *reportConfig* is periodical, *eventTriggered* or *condTriggerConfig*:
...
    5> if the *measObject* is associated to NR and the *rsType* is set to *csi-rs*:
    ...
        6> if the trigger quantity (i.e., *MeasTriggerQuantity*) is set to *adaptiveRsrp*, *adaptiveRsrq*, or *adaptiveSinr*:
            7> update the current trigger quantity by subtracting the change of the current and previous NR SpCell measurement quantities (i.e., RSRPs, RSRQs, or SINRs) from the previous trigger quantity
            7> derive cell measurement results based on CSI-RS for the trigger quantity
    ...
    5> if the *measObject* is associated to NR and the *rsType* is set to *ssb*:
    ...
        6> if the trigger quantity (i.e., *MeasTriggerQuantity*) is set to *adaptiveRsrp*, *adaptiveRsrq*, or *adaptiveSinr*:
            7> update the current trigger quantity by subtracting the change of the current and previous NR SpCell measurement quantities (i.e., RSRPs, RSRQs, or SINRs) from the previous trigger quantity
            7> derive cell measurement results based on SS/PBCH block for the trigger quantity
    ...

Definitions of Delta RSRP/RSRQ/SINR

Please see Illustrations 7, 8, 9, 10, 11, and 12.

New Event Description in Measurement Report Triggering:

In one realization of an embodiment, new report triggering event can be defined as illustrated in TABLE 29. TABLE 29 shows an example of new event description for the case in which UE 116 enters or leaves the triggering condition with respect to the criteria, whether interference becomes larger than an adaptive threshold or not. Here, the adaptive threshold is updated inversely proportional to the change of serving cell signal qualities of the current and previous measurements. The update rule, AdaptiveTresh$_n$=AdaptiveTresh$_{n-1}$−DeltaMp, is included in the new event description.

TABLE 29

AN EXAMPLE OF NEW EVENT DESCRIPTION IN MEASUREMENT REPORT TRIGGERING OF CLAUSE 5.5.4 OF TS 38.331

(interference becomes larger than adaptive threshold updated inversely proportional to change of serving cell signal qualities)
The UE shall:
  1> consider the entering condition for this event to be satisfied when condition S3-1, as specified below, is fulfilled;
  1> consider the leaving condition for this event to be satisfied when condition S3-2, as specified below, is fulfilled;
  1> use the SpCell for *Mp*.
  NOTE:  The parameters of the reference signal(s) of the cell(s) that triggers the event are indicated in the *measObjectNR* associated to the event which may be different from the *measObjectNR* of the NR SpCell.
Inequality S3-1 (Entering condition)
$Mn + Ofn + Ocn - Hys > Adaptive\ Thresh n$
Inequality S3-2 (Leaving condition)
$Mn + Ofn + Ocn + Hys < AdaptiveThresh n$
Adaptive threshold update: (Update rule)
*AdaptiveTresh$_n$ = AdaptiveTresh$_{n-1}$ - DeltaMP*
The variables in the formula are defined as follows:

TABLE 29-continued

AN EXAMPLE OF NEW EVENT DESCRIPTION IN MEASUREMENT REPORT
TRIGGERING OF CLAUSE 5.5.4 OF TS 38.331

$Mn$ is the measurement result of the neighbouring cell, not taking into account any offsets.
$DeltaMp$ is the change of the measurement results at the current and previous measurements for the NR SpCell, not taking into account any offsets.
$Ofn$ is the measurement object specific offset of the neighbour cell (i.e. *offsetMO* as defined within *measObjectNR* corresponding to the neighbour cell).
$Ocn$ is the measurement object specific offset of the neighbour cell (i.e. *cellIndividualOffset* as defined within *measObjectNR* corresponding to the neighbour cell), and set to zero if not configured for the neighbour cell.
$Hys$ is the hysteresis parameter for this event (i.e. *hysteresis* as defined within *reportConfigNR* for this event).
$AdaptiveThresh_n$ is the updated threshold parameter for this event. (when $n=0$, initialize $AdaptiveThresh_n = s3\text{-}Threshold$ as defined within *reportConfigNR* for this event.
$AdaptiveThresh_{n-1}$ is the previous threshold parameter for this event.
$Mn$ is expressed in dBm in case of RSRP, or in dB in case of RSRQ and RS-SINR.
$DeltaMp$ is expressed in dB.
$Hys$, $Ofn$, $Ocn$ are expressed in dB.
$AdaptiveThresh_{n-1}$, $AdaptiveThresh_n$ are expressed in the same unit as $Mn$.

Figure 14:
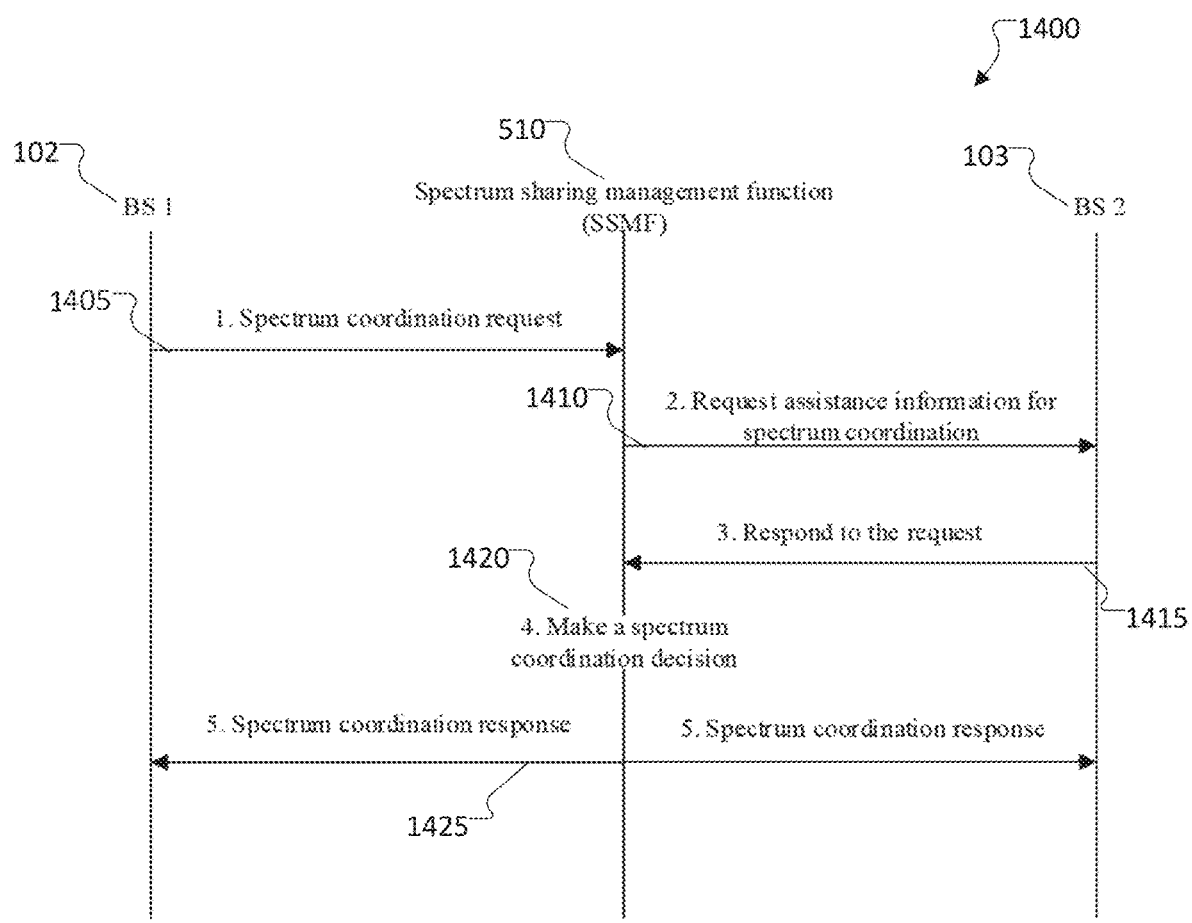
FIG. 14 illustrates a signal diagram for spectrum coordination between base stations via a spectrum sharing management function according to embodiments of the present disclosure.

Components for Spectrum Coordination: Spectrum Coordination (SC) Request and Response FIG. 14 illustrates a signal diagram for spectrum coordination between BSs via SSMF according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The spectrum coordination 1100 depicted in the example depicted is implemented by a transmitter and processor chains in, for example, a gNB 102, gNB 103, and SSMF 510 (e.g., S1/NG interface) in network 500.

In certain embodiments, gNB 102, gNB 103, and SSMF 510 perform spectrum coordination (SC) operations. In certain embodiments, gNB 102 and gNB 103 are associated with a same network, or different network, such as a first network and a second network (1N, 2N), which can be (NPN, PN), (PN, NPN), (PN, PN), or (NPN, NPN). In certain embodiments, gNB 102 and gNB 103 can be operated by either a single operator or different operators.

In the example shown in FIG. 14, gNB 102 sends spectrum coordination request 1405 to SSMF 510 via link 515. In certain embodiments, spectrum coordination request 1405 includes one or more of the following options but are not limited to the following options.
 (1) resource block (RB) indices/spectrum band;
 (2) RB indices/spectrum band, and/or corresponding interference levels;
 (3) RB indices/spectrum band, and/or corresponding interference levels, corresponding the change of interference levels;
 (4) RB indices/spectrum band, corresponding interference levels, corresponding the change of interference levels, and/or cell ID(s) to be coordinated with;
 (5) RB indices/spectrum band, corresponding interference levels, corresponding the change of interference levels, cell ID(s) to be coordinated with, number of slots/subframes/frames;
 (6) RB indices/spectrum band, corresponding interference levels, corresponding the change of interference levels, cell ID(s) to be coordinated with, number of slots/subframes/frames, slot/subframe/frame indices;
 (7) RB indices/spectrum band, corresponding interference levels, corresponding the change of interference levels, cell ID(s) to be coordinated with, number of slots/subframes/frames, slot/subframe/frame indices, and/or time resources/period;
 (8) RB indices/spectrum band, corresponding interference levels, corresponding the change of interference levels, cell ID(s) to be coordinated with, number of slots/subframes/frames, slot/subframe/frame indices, time resources/period, expected data load traffic for an upcoming time duration, and/or current data load traffic; or
 (9) Any combination of the elements in list above.

The SSMF 510 requests 1410 that gNB 103 provide assistance information for spectrum coordination. In certain embodiments, the request 1410 contains one or more of the following options, but are not limited to the following options:
 (1) RB indices/spectrum band, and/or corresponding average/maximum transmit power levels in use;
 (2) RB indices/spectrum band, corresponding average/maximum transmit power levels in use, and/or amount of data usages for the corresponding RB indices/spectrum band;
 (3) RB indices/spectrum band, corresponding average/maximum transmit power levels, amount of data usages for the corresponding RB indices/spectrum band, expected data load traffic for an upcoming time duration, and/or current data load traffic; or
 (4) Any combination of the elements in list above In response, gNB 103 sends a response 1415 that provides the requested information to SSMF 510. In certain embodiments, request 1410 and response 1415 are not performed if not needed. The SSMF 510 makes a spectrum coordination decision 1420, such as based on its own policy or predetermined policy using the provided assistance information and/or spectrum coordination request 1405. Thereafter, the SSMF 510 sends spectrum coordination responses 1425 to gNB 102 and gNB 103, respectively. In one example, the spectrum coordination response 1425 can contain one or more of the following options, but are not limited to the following options:
 (1) ACK message;
 (2) Reject message;
 (3) RB indices/spectrum band;

(4) RB indices/spectrum band, and/or corresponding target average/maximum transmit power levels;
(5) RB indices/spectrum band, and/or corresponding target average/maximum transmit power levels, time resources, and/or time duration.

In one example, the ACK message can be represented as 1-bit indicator, where '0' stands for performing the operations as described in spectrum coordination request 1405 and '1' stands for performing the operations as described in spectrum coordination response 1425. In one example, the reject message can be represented as 1-bit indicator, where '0' stands for rejecting the spectrum coordination request 1405 and '1' stands for rejecting the spectrum coordination request 1405 and allowing gNB 102 to send a modified spectrum coordination request.

Figure 15:
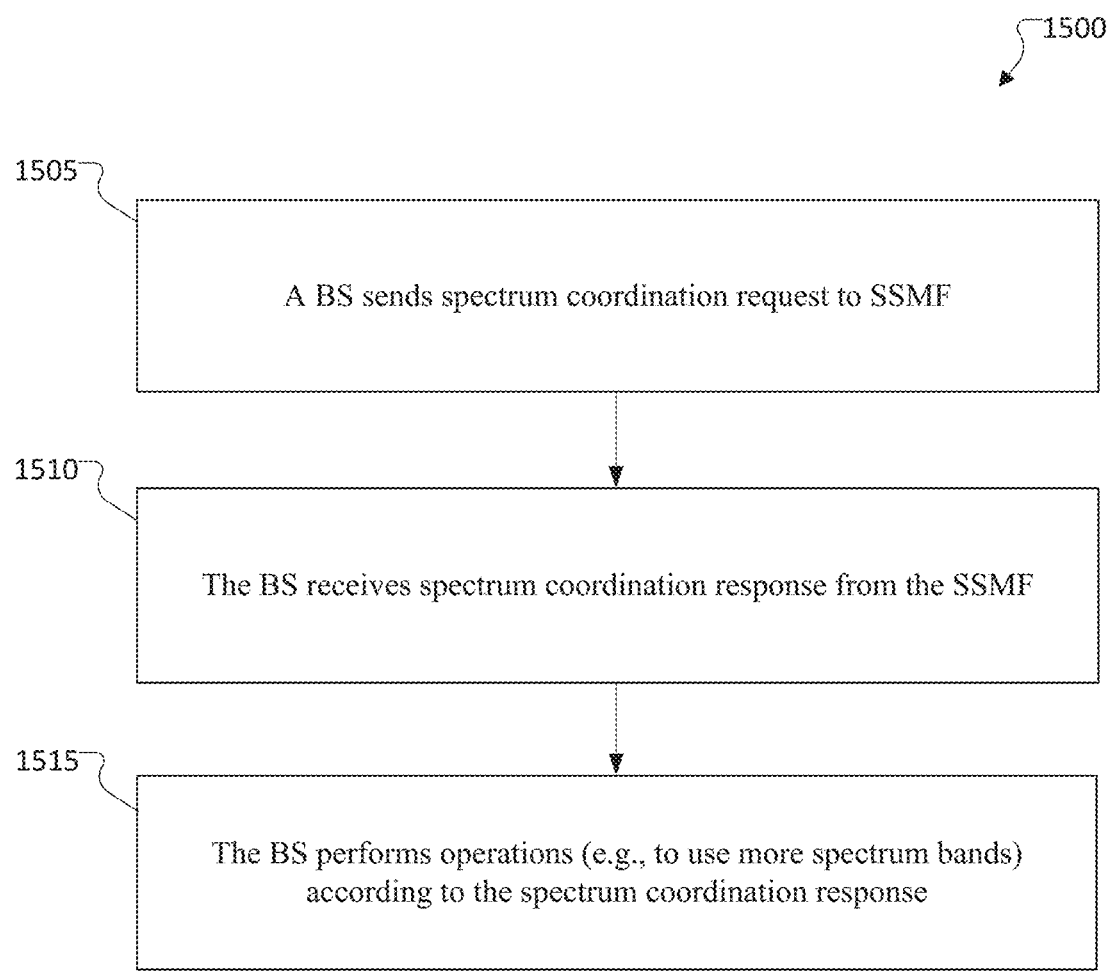
FIG. 15 illustrates a requesting base station process for spectrum coordination according to embodiments of the present disclosure.

FIG. 15 illustrates a requesting BS process for spectrum coordination according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The request spectrum coordination process 1500 depicted in the example depicted is implemented by a transmitter chain in, for example, a BS. The request spectrum coordination process 1500 can be accomplished by, for example, gNB 102 or gNB 103 in network 500.

At operation 1505, gNB 102 sends spectrum coordinate request to SMF 510 via link 515. In one example, spectrum coordination request can contain RB indices, spectrum band, corresponding interference level, corresponding the change of interference levels, cell ID(s) of BS(s) to be coordinated with, time duration, expected data load traffic for an upcoming time duration, and/or current data load traffic.

At operation 1510, gNB 102 receives spectrum coordination response from SMF 510. In certain embodiments, the spectrum coordination response can contain ACK, and/or reject message. In certain embodiments, the spectrum coordination response can contain a smaller subset of requested information including RB indices and/or subframe/frame indices. In certain embodiments, the spectrum coordination response can contain other spectrum band other than requested band, time period to allow for the band usage, and/or max/average transmit power level corresponding to the band.

At operation 1515, gNB 102 performs operations according to the spectrum coordination response until an update for the process is received. In certain embodiments, for the operations, gNB 102 be allowed to utilize the spectrum band or resource blocks corresponding to the RB indices, which are indicated in the spectrum coordination response. In certain embodiments, for the operations, gNB 102 can be allowed to utilize the spectrum band or resource blocks corresponding to the RB indices for a time period with the constraint of maximum and average transmit powers. The parameters are indicated in the spectrum coordination response. In certain embodiments, for the operations, gNB 102 can be allowed to utilize the spectrum band or resource blocks corresponding to the RB indices for a time period corresponding to a set of slots/subframes/frames, with the constraint of maximum and average transmit powers. In certain embodiments, for the operations, gNB 102 can be allowed to perform the original operation without adjusting any spectrum usage (this case is the case that the BS receives the reject message).

Figure 16:
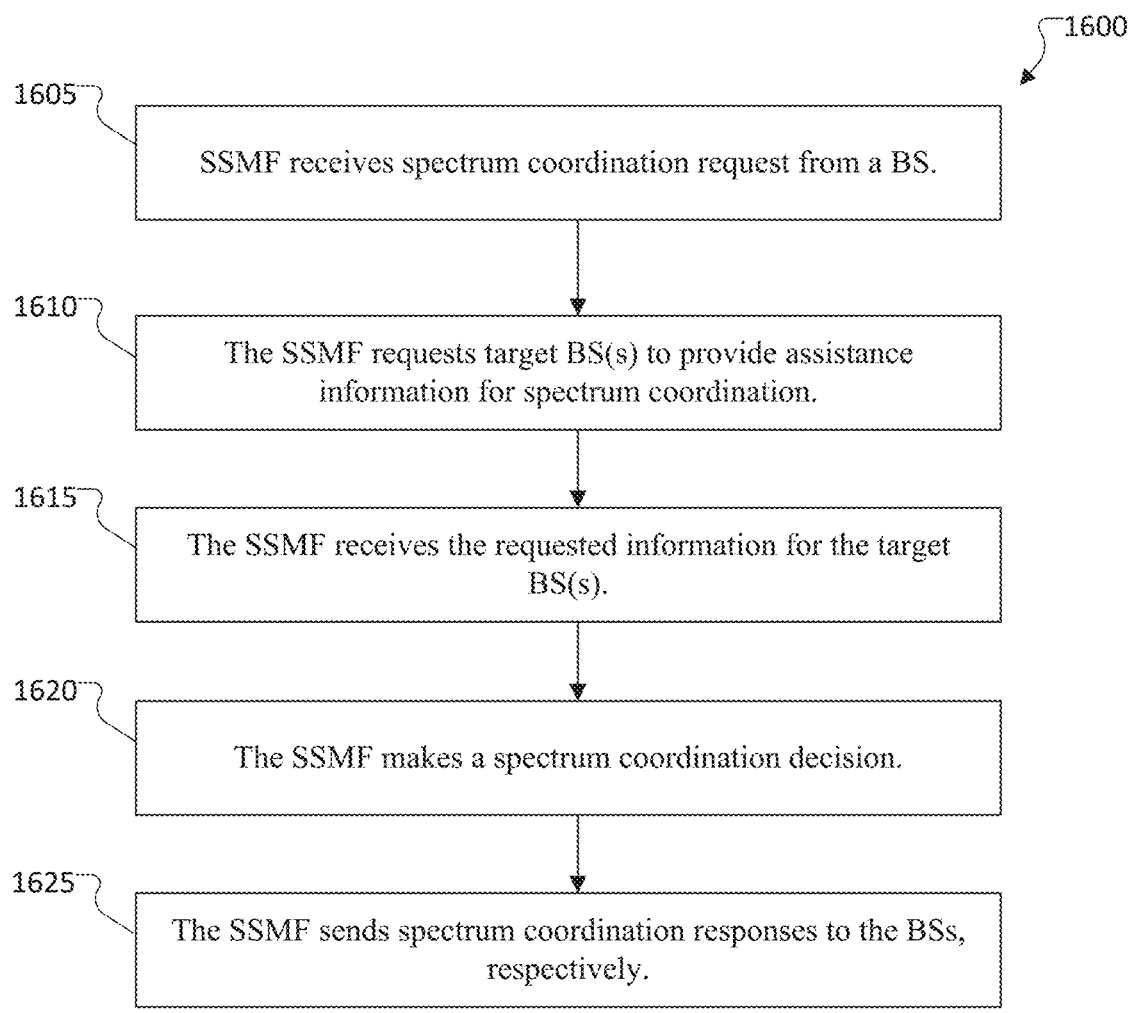
FIG. 16 illustrates a spectrum sharing management function process for spectrum coordination according to embodiments of the present disclosure.

FIG. 16 illustrates a SSMF process for spectrum coordination according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The request spectrum coordination process 1600 depicted in the example depicted is implemented by a transmitter chain in, for example, an SSMF. The request spectrum coordination process 1600 can be accomplished by, for example, SSMF 510 in network 500.

At operation 1605, SSMF 510 receives spectrum coordination request from a BS, such as gNB 102, for example, in PN/NPN RAN node. In certain embodiments, the spectrum coordination request can contain RB indices, spectrum band, corresponding interference level, cell ID(s) of BS(s) to be coordinated with, time duration, expected data load traffic for an upcoming time duration, and/or current data load traffic.

At operation 1610, the SSMF 510 requests target BS(s), such as gNB 103, to provide assistance information spectrum coordination decision. Here, the target BS(s) can be the BS to be coordinated with or another BS to assist SSMF 510 for spectrum coordination. In certain embodiments, the information requested to target BS(s) can include RB indices/spectrum band, corresponding average/maximum transmit power levels, amount of data usages for the corresponding RB indices/spectrum band, expected data load traffic for an upcoming time duration, and/or current data load traffic.

At operation 1615, the SSMF 510 receives the requested information from the target BS(s). For example, SSMF 510 can receive the response message from gNB 103.

At operation 1620, the SSMF 510 makes a spectrum coordination decision. In certain embodiments, the decision can be based on SSMF's own policy or a pre-determined rule(s). In certain embodiments, the policy can be determined by the information included in the spectrum coordination request at operation 1605 and/or provided assistance information at operation 1615.

At operation 1625, the SSMF 510 sends spectrum coordination responses to the requested BS, such as gNB 102, and target BS(s), such as gNB 103, respectively. In certain embodiments, the spectrum coordination response can contain ACK, and/or reject message. In certain embodiments, the spectrum coordination response can contain a smaller subset of requested information including RB indices and/or subframe/frame indices. In certain embodiments, the spectrum coordination response can contain other spectrum bands, other than requested band, time period to allow for the band usage, and/or max/average transmit power level corresponding to the band.

In certain embodiments, the SSMF 510 can determine the priority relationship for spectrum coordination between BSs, by the following policy. SSMF 510 tracks the amounts of shared spectrum usages for both (or all) the BSs, which can be referred to, e.g., $U_1$ and $U_2$. In one example, the SSMF 510 can receive the amounts of expected data traffic load for an upcoming time duration from both (or all) the BSs, which can be referred to, e.g., $L_1$ and $L_2$. In one example, the SSMF 510 can determine the priority by comparing $$\frac{L_1}{U_1} \text{ and } \frac{L_2}{U_2}$$

as a fairness metric. Computing the priority and the metric, the SSMF 510 can make a spectrum coordination decision based on its own policy or pre-determined policy and can send spectrum coordination responses according to the policy to the BSs, respectively.

Figure 17:
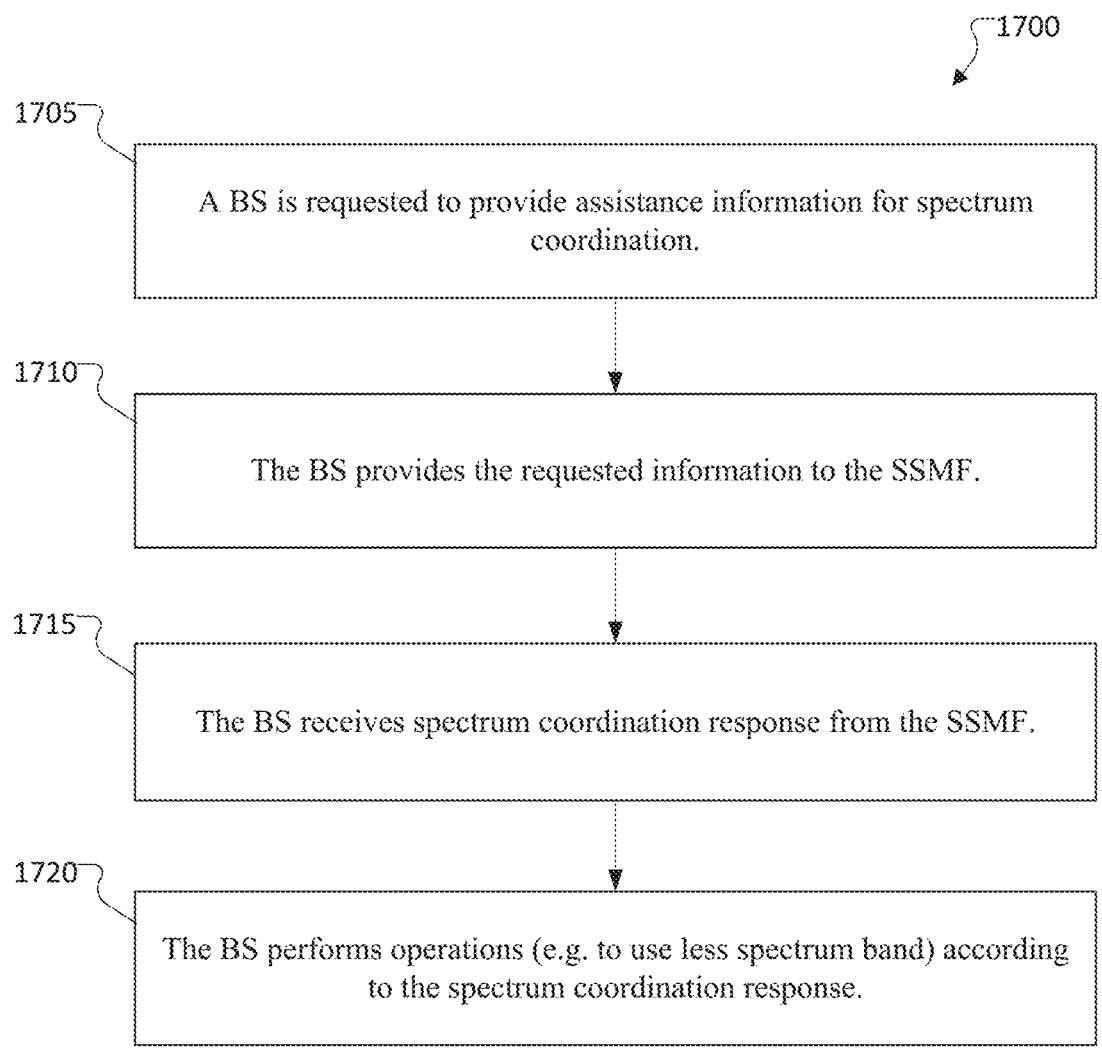
FIG. 17 illustrates a requested base station process for spectrum coordination according to embodiments of the present disclosure.

FIG. 17 illustrates a requested BS process for spectrum coordination according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The request spectrum coordination process 1700 depicted in the example depicted is implemented by a transmitter chain in, for example, a BS. The request spectrum coordination process 1700 can be accomplished by, for example, gNB 102 or gNB 103 in network 500.

At operation 1705, gNB 103, as a target BS, is requested to provide assistance information for spectrum coordination. In certain embodiments, the requested information can include RB indices/spectrum band, corresponding average/maximum transmit power levels, amount of data usages for the corresponding RB indices/spectrum band, expected data load traffic for an upcoming time duration, and/or current data load traffic.

At operation 1710, gNB 103 provides the requested information for the SSMF 510.

At operation 1715, gNB 103 receives spectrum coordination response from the SSMF 510. In certain embodiments, the spectrum coordination response can contain messages to keep operating without change. In certain embodiments, spectrum coordination response can contain RB indices, spectrum band, subframe/frame indices, time period to allow for the band usage, max/average transmit power level, and/or turn-off indicator, and so forth.

At operation 1720, gNB 103 performs operations according to the spectrum coordination response. In certain embodiments, for the operations, gNB 103 can be allowed to utilize the spectrum band or resource blocks corresponding to the RB indices, which are indicated in the spectrum coordination response. In certain embodiments, for the operations, gNB 103 can be allowed to utilize the spectrum band or resource blocks corresponding to the RB indices for a time period with the constraint of maximum and average transmit powers. The parameters are indicated in the spectrum coordination response. In certain embodiments, for the operations, gNB 103 can be allowed to utilize the spectrum band or resource blocks corresponding to the RB indices for a time period corresponding to a set of slots/subframes/frames, with the constraint of maximum and average transmit powers. In certain embodiments, for the operations, gNB 103 can be allowed to perform the original operation without adjusting any spectrum usage (this case is the case that the BS receives the reject message).

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Figure 18:
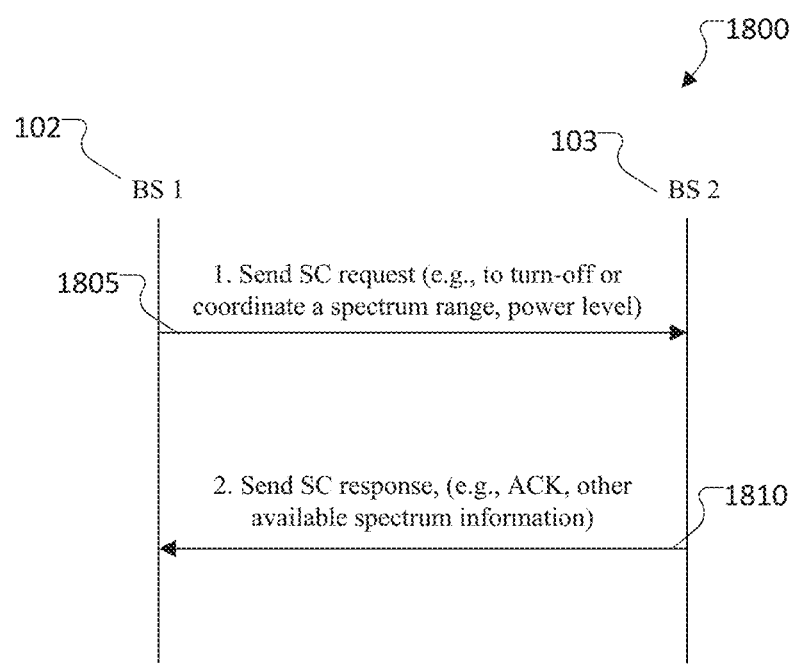
FIG. 18 illustrates direct spectrum coordination between base stations via an Xn interface according to embodiments of the present disclosure.

FIG. 18 illustrates direct spectrum coordination between BSs via Xn interface according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The spectrum coordination 1800 depicted in the example depicted is implemented by a transmitter and processor chains in, for example, a gNB 102 and gNB 103 in network 500. In one example, BS 1 and BS 2 are associated with a first network and a second network (1N, 2N), which can be (NPN, PN), (PN, NPN), (PN, PN), and (NPN, NPN).

In the example shown in FIG. 18, gNB 102 sends spectrum coordination request 1805 to gNB 103, such as via link 505. In certain embodiments, the spectrum coordination request can contain one or more of the following options, but are not limited to the following options:

(1) RB indices/spectrum band;
(2) RB indices/spectrum band, and/or turn-off indicator;
(3) RB indices/spectrum band, and/or corresponding interference levels;
(4) RB indices/spectrum band, corresponding interference levels, and/or corresponding the change of interference levels;
(5) RB indices/spectrum band, corresponding interference levels, corresponding the change of interference levels, and/or target transmit power level corresponding RB/spectrum band;
(6) RB indices/spectrum band, corresponding interference levels, corresponding the change of interference levels, and/or target transmit power level corresponding RB/spectrum band, slots/subframes/frames indices;
(7) Request indicator to allow other available spectrum;
(8) Request indicator to reduce power for RB indices/spectrum band; or
(9) Any combination of the elements in list above In response, gNB 103 sends spectrum coordination response 1810 to gNB 102 via link 505. In certain embodiments, the spectrum coordination response can contain one or more of the following options, but are not limited to the following options:

(1) ACK message;
(2) Reject message;
(3) Other available spectrum information including RB indices and/or spectrum band;
(4) Other available spectrum information including RB indices and/or spectrum band, and/or time period to allow for the spectrum usage;
(5) Other available spectrum information including RB indices and/or spectrum band, and/or time period to allow for the spectrum usage, allowed average/max transmit power for the spectrum band/RB indices;
(6) RB indices/spectrum band, slots/subframes/frames indices, (i.e., time and frequency patterns); or
(7) Any combination of the elements in list above.

In certain embodiments, the ACK message can be represented as 1-bit indicator, where '0' stands for performing the operations as described in spectrum coordination request 1805 and '1' stands for performing the operations as described in spectrum coordination response 1810. In certain embodiments, the reject message can be represented as 1-bit indicator, where '0' stands for rejecting the spectrum coordination request 1805 and '1' stands for rejecting the spectrum coordination request 1810 and allowing gNB 102 to send a modified spectrum coordination request.

PSS/SSS Signal Modification for Legacy UE not to Detect NPN SS/PBCH

In certain examples in which NPN and PN BSs coexist in proximity as illustrated in FIG. 5, there can be unnecessary burdens for PN UE (or legacy UE), which is not eligible to access the NPN BS, due to unintentional detection process on SS/PBCH blocks sent from NPN BS. Since NPN and PN BSs can use a same spectrum band in spectrum sharing networks, it is likely that PN UEs in the coverage of NPN BS detect SS/PBCH blocks of NPN BS, which could induce unnecessary process/operation and power consumption to the PN UEs.

In the following, an embodiment for primary synchronization signal (PSS)/secondary synchronization signal (SSS) signal modification in SS/PBCH block for UE eligible to access NPN BS (and for UE, not eligible to access NPN BS, not to detect the modifies PSS/SSS signal) is provided. To help reader understand easily, the principle for PSS/SSS modification in this invention is explained as follows. 1) The same structure of SS/PBCH block is used for UE to keep the same receiver architecture to detect the modified SS/PBCH block. 2) The modified PSS/SSS signal is designed in a manner that the cross correlations between the original PSS/SSS and modified PSS/SSS signals can be minimized. 3) The modified PSS/SSS signal is designed in a manner that it can preserve the good properties of the original PSS/SSS signal including gold sequence properties, cross correlation properties across different physical cell IDs, and so for.

An embodiment for PSS/SSS signal modification is as follows:

(1) Applying different sequence generation function and offset index in m for PSS sequence modification, and/or
(2) Applying offset index in $m_0$ for SSS sequence modification.

In one example, the modified sequence $d_{npn\text{-}pss}(n)$ for the primary synchronization signal can be defined as follows. The modified part from the original PSS sequence $d_{pss}(n)$ as described in Clause 7.4.2 of TS 38.211 is highlighted. For a given $N_{ID}^{(2)} \in \{0,1,2\}$, $$d_{npn\text{-}PSS}(n)=1-2x(m), \quad (8)$$

$$m=(n+43N_{ID}^{(2)}+c_{offset})\bmod 127, \quad (9)$$

$$0 \le n < 127, \quad (10)$$

where $x(i+7)=(x(i+1)+x(i))\bmod 2$ and $[x(6)\ x(5)\ x(4)\ x(3)\ x(2)\ x(1)\ x(0)]=[0\ 0\ 0\ 0\ 0\ 0\ 1]$, which is called sequence generation function. Here, $c_{offset}$ can be an arbitrary integer value in range $[0,127)$. In one example, $c_{offset}=3$, 21, or 64. In this example, the cross correlation between $d_{npn\text{-}pss}(n)$ and $d_{pss}(n)$ is $-1$, for any value of $N_{ID}^{(2)} \in \{0,1,2\}$ for $d_{npn\text{-}pss}(n)$ and $d_{pss}(n)$, respectively. In other words, the cross correlation between $d_{npn\text{-}pss}(n)$ with any $N_{ID}^{(2)} \in \{0,1,2\}$ and $d_{pss}(n)$ with any $N_{ID}^{(2)} \in \{0,1,2\}$ is $-1$, if $c_{offset}=3$, 21, or 64 in the realization above. If another value $c_{offset}$ other than 3, 21, or 64 is applied in the above example, the cross correlation yields $-1$, 15, or $-17$ which is larger than or equal to $-1$. In another example, a different sequence generation function can be applied, and a corresponding different $c_{offset}$ value yielding cross correlation=$-1$ for all $N_{ID}^{(2)}$ combinations of $d_{npn\text{-}pss}(n)$ and $d_{pss}(n)$ can be applied for the modified PSS sequence generation.

In another example, the modified sequence $d_{npn\text{-}sss}(n)$ for the secondary synchronization signal can be defined as follows. The modified part from the original SSS sequence $d_{npn\text{-}sss}(n)$ as described in Clause 7.4.2. of TS 38.211 is highlighted. For given $N_{ID}^{(2)} \in \{0,1,2\}$, and $N_{ID}^{(1)} \in \{0, 1, \ldots, 335\}$, $$d_{npn\text{-}sss}(n) = [1 - 2x_0((n+m_0)\bmod 127)][1 - 2x_1((n+m_1)\bmod 127)] \quad (11)$$

$$m_0 = 15\left\lfloor\frac{N_{ID}^{(1)}}{112}\right\rfloor + 5N_{ID}^{(2)} + m_{0,offset} \quad (12)$$

$$m_1 = N_{ID}^{(1)}\bmod 112 \quad (13)$$

$$0 \le n < 127 \quad (14)$$

where $x_0(i+7)=(x_0(i+4)+x_0(i))\bmod 2$, $x_1(i+7)=(x_1(i+1)+x_1(i))\bmod 2$, and $[x_0(6)\ x_0(5)\ x_0(4)\ x_0(3)\ x_0(2)\ x_0(1)\ x_0(0)]=[0\ 0\ 0\ 0\ 0\ 0\ 1]$, $[x_1(6)\ x_1(5)\ x_1(4)\ x_1(3)\ x_1(2)\ x_1(1)\ x_1(0)]=[0\ 0\ 0\ 0\ 0\ 0\ 1]$. Here, in one example, $m_{0,offset}$ can be an arbitrary integer value in range $[1,127)$. In another example, different sequence generation function can be applied.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. A user equipment (UE) comprising:
a transceiver configured to receive configuration information for measuring interference from a neighboring cell; and
a processor operably coupled to the transceiver, the processor configured to:
measure, via the transceiver, the interference from the neighboring cell based on the configuration information,
measure, via the transceiver, signal quality of a serving cell,
compute a change in the measured interference from the neighboring cell based on a current measured interference level of the neighboring cell and a previous measured interference level of the neighboring cell,
update a first threshold based on the signal quality of the serving cell, and
determine, based on at least in part a determination that the change in the measured interference exceeds the first threshold, whether to generate a measurement report,
wherein the transceiver is configured to transmit the measurement report on an uplink channel, and
wherein the first threshold is an adaptive threshold based on the measured signal quality of the serving cell of the UE.

2. The UE of claim 1, wherein the processor is further configured to:
measure, via the transceiver, the signal quality of the serving cell of the UE,
compute a change in the measured signal quality of the serving cell based on a current measured signal quality and a previous measured signal quality, and
determine whether to generate the measurement report further based on a determination that the change in the measured signal quality is less than a second threshold.

3. The UE of claim 2, wherein the processor is configured to apply a layer-3 filter to outputs of the current and previous measured signal qualities.

4. The UE of claim 2, wherein:
the processor is configured to modify the first threshold:
as a function of the measured signal quality of the serving cell,
as a minimum threshold value or a maximum threshold value selectable based on the measured signal quality of the serving cell, or
as an inverse, linear, or concave function of the measured signal quality of the serving cell.

5. The UE of claim 2, wherein:
the configuration information is received in a higher layer radio resource control (RRC) configuration message,
the higher layer radio resource control (RRC) configuration message indicates a value for the first threshold and a value for a second threshold, and
the change in the measured interference and the change in the measured signal quality are based on at least one of a change in a reference signal received power (RSRP), a reference signal received quality (RSRQ), and a signal to interference and noise ratio (SINR).

6. The UE of claim 1, wherein the configuration information is received via L1 or L2 downlink (DL) control comprising a physical downlink control channel (PDCCH) or medium access control-control element (MAC CE)-based DL control.

7. A base station (BS) comprising:
a processor; and
a transceiver operably coupled to the processor, the transceiver configured to:
transmit configuration information for measuring interference from a neighboring BS,
receive a measurement report from a user equipment (UE),
transmit, via the transceiver, a spectrum coordination request to a spectrum sharing management function (SSMF), and receive a spectrum coordination response from the SSMF, wherein the spectrum coordination response is transmitted to the BS in response to a decision by the SSMF based on a response, received from the neighboring BS, to a request for assistance information for spectrum coordination, wherein the measurement report is transmitted to the BS from the UE based at least in part on a change in the interference measured from the neighboring BS between a current interference level of the neighboring BS and a previous interference level of the neighboring BS exceeding a first threshold, and wherein the first threshold is an adaptive threshold based on a measured signal quality of a serving BS of the UE.

8. The BS of claim 7, wherein the measurement report is received further based on a change in a signal quality from the BS between a current signal quality and a previous signal quality being less than a second threshold.

9. The BS of claim 8, wherein the first threshold is configured to be modified as a function of one of:
the signal quality from the BS,
an inverse, linear, or concave function of the signal quality from the BS, or
a minimum threshold value and a maximum threshold value selectable based on the signal quality from the BS.

10. The BS of claim 8, wherein:
the configuration information is transmitted in a higher layer radio resource control (RRC) configuration message,
the higher layer radio resource control (RRC) configuration message indicates a value for the first threshold and a value for a second threshold, and
the change in the measured interference and the change in the signal quality are based on at least one of a change in a reference signal received power (RSRP), a reference signal received quality (RSRQ), and a signal to interference and noise ratio (SINR).

11. The BS of claim 7,
wherein the spectrum coordination request includes one or more of: RB indices/spectrum band, corresponding interference levels, corresponding the change in the interference, cell ID(s) to be coordinated with, a number of slots/subframes/frames, slot/subframe/frame indices, time resources/period, an expected data load traffic for an upcoming time duration, or a current data load traffic;
wherein the request for assistance information for spectrum coordination comprises one or more of: the RB indices/spectrum band, the corresponding average/maximum transmit power levels, an amount of data usages for the corresponding RB indices/spectrum band, expected data load traffic for an upcoming time duration, or the current data load traffic,
wherein the decision is based on a policy or a pre-determined rule, and
wherein the spectrum coordination response includes one or more of: an acknowledgement (ACK)/negative ACK (NACK), the RB indices/spectrum band, a corresponding target average/maximum transmit power levels, time resources, or time duration.

12. The BS of claim 11, wherein the SSMF is configured to one or more of:
determine a priority relationship for spectrum coordination between the BS and the neighboring BS according to the policy;
track amounts of shared spectrum usages for the BS and the neighboring BS;
receive amounts of expected data traffic load for an upcoming time duration from the BS and the neighboring BS;
determine the priority relationship by comparing the amounts of shared spectrum usages for the BS and the neighboring BS and amounts of expected data traffic load for an upcoming time duration from the BS and the neighboring BS,
wherein the determination is made on the policy or a pre-determined policy; and
send, to the BS and the neighboring BS, spectrum coordination responses according to the policy.

13. The BS of claim 11, wherein the processor is further configured to:
perform operations according to the spectrum coordination response, the operations comprising the processor configured to at least one of:
utilize a spectrum band or resource blocks corresponding to the RB indices,
utilize the spectrum band or resource blocks corresponding to the RB indices for a time period with a constraint of maximum and average transmit powers, wherein parameters are indicated in the spectrum coordination response,
utilize the spectrum band or resource blocks corresponding to the RB indices for a time period corresponding to a set of slots/subframes/frames, with the constraint of maximum and average transmit powers, and perform, in response to the NACK, an original operation without adjusting any spectrum usage.

14. The BS of claim 11, wherein the processor is further configured to:
transmit a modified primary synchronization signal (PSS)/secondary synchronization signal (SSS), and wherein the PSS/SSS is modified by one or more of:
application of a different sequence generation function and offset index in m for PSS sequence modification, or
application of a offset index in $m_0$ for SSS sequence modification.

15. A method for operating a user equipment (UE), the method comprising:
receiving configuration information for measuring interference from a neighboring cell;
measuring the interference from the neighboring cell based on the configuration information;
measuring signal quality of a serving cell;
computing a change in the measured interference from the neighboring cell based on a current measured interference level of the neighboring cell and a previous measured interference level of the neighboring cell;
updating a first threshold based on the signal quality of the serving cell;
determining, based on at least in part a determination that the change in the measured interference exceeds the first threshold, whether to generate a measurement report; and
transmitting the measurement report on an uplink channel,
wherein the first threshold is an adaptive threshold based on the measured signal quality of the serving cell of the UE.

16. The method of claim 15, further comprising:
measuring the signal quality of the serving cell of the UE; and
computing a change in the measured signal quality of the serving cell based on a current measured signal quality and a previous measured signal quality,
wherein determining whether to generate the measurement report further comprises determining whether to generate the measurement report based on a determination that the change in the measured signal quality is less than a second threshold.

17. The method of claim 16, further comprising applying a layer-3 filter to outputs of the current and previous measured signal qualities.

18. The method of claim 16, further comprising:
modifying the first threshold:
as a function of the measured signal quality of the serving cell,
as a minimum threshold value or a maximum threshold value selectable based on measured signal quality of the serving cell, or
as an inverse, linear, or concave function of the measured signal quality of the serving cell.

19. The method of claim 16, wherein:
the configuration information is received in a higher layer radio resource control (RRC) configuration message,
the higher layer radio resource control (RRC) configuration message indicates a value for the first threshold and a value for a second threshold, and
the change in the measured interference and the change in the measured signal quality are based on at least one of a change in a reference signal received power (RSRP), a reference signal received quality (RSRQ), and a signal to interference and noise ratio (SINR).

20. The method of claim 15, wherein the configuration information is received via L1 or L2 downlink (DL) control comprising a physical downlink control channel (PDCCH) or medium access control-control element(MAC CE)-based DL control.

* * * * *